US011656090B2

(12) United States Patent
Soni et al.

(10) Patent No.: US 11,656,090 B2
(45) Date of Patent: May 23, 2023

(54) METHOD AND SYSTEM FOR GENERATING NAVIGATION DATA FOR A GEOGRAPHICAL LOCATION

(71) Applicant: HERE GLOBAL B.V., Eindhoven (NL)

(72) Inventors: Abhilshit Soni, Gujarat (IN); Akshay Pachaar, Haryana (IN)

(73) Assignee: HERE Global B.V., Eindhoven (NL)

( * ) Notice: Subject to any disclaimer, the term of this patent is extended or adjusted under 35 U.S.C. 154(b) by 806 days.

(21) Appl. No.: 16/425,587

(22) Filed: May 29, 2019

(65) Prior Publication Data

US 2020/0109962 A1 Apr. 9, 2020

(30) Foreign Application Priority Data

Oct. 8, 2018 (IN) .............................. 201811038113

(51) Int. Cl.
*G01C 21/36* (2006.01)
*G06T 7/174* (2017.01)
(Continued)

(52) U.S. Cl.
CPC ..... *G01C 21/3647* (2013.01); *G01C 21/3602* (2013.01); *G01C 21/3629* (2013.01);
(Continued)

(58) Field of Classification Search
CPC ............ G01C 21/3647; G01C 21/3629; G01C 21/3644; G01C 21/3476; G06T 7/11;
(Continued)

(56) References Cited

U.S. PATENT DOCUMENTS

| 6,222,583 | B1 * | 4/2001 | Matsumura ........ G01C 21/3673 348/113 |
| 8,688,377 | B1 | 4/2014 | Urbach et al. |

(Continued)

FOREIGN PATENT DOCUMENTS

| JP | 2013014466 | * | 7/2011 | ............. B29C 45/00 |
| JP | 2014163683 | A | | 9/2014 | |

(Continued)

OTHER PUBLICATIONS

Do, Q.V, and L.C Jain. "A Visual Landmark Recognition System for Autonomous Robot Navigation." 2006 International Conference on Computational Inteligence for Modelling Control and Automation and International Conference on Intelligent Agents Web Technologies and International Commerce (CIMCA'06). IEEE, 2006. 237-2.*

(Continued)

*Primary Examiner* — Maceeh Anwari
(74) *Attorney, Agent, or Firm* — Ditthavong, Steiner & Mlotkowski

(57) ABSTRACT

An approach is provided for generating navigation data of a geographical location. The approach involves identifying a landmark located along a source road from a source image and segmenting the source image using a deep learning model to identify a segmentation mask. The approach also involves generating a template image based on the segmentation mask and a street image of the landmark, and matching the template image successively with a sequence of images of the landmark to determine a confidence score. The approach further involves, identifying a first image from the sequence of images with confidence score below a predetermined threshold, and selecting a second image with confidence score above the predetermined threshold from the sequence of images. The approach further involves calculating a visibility distance of the landmark based on the (Continued)

source image and the second image, and generating the navigation data based on the calculated visibility distance.

17 Claims, 16 Drawing Sheets

(51) Int. Cl.
  *G08G 1/0968* (2006.01)
  *G06T 7/11* (2017.01)
  *G06V 10/75* (2022.01)

(52) U.S. Cl.
  CPC ............ *G01C 21/3644* (2013.01); *G06T 7/11* (2017.01); *G06T 7/174* (2017.01); *G06V 10/751* (2022.01); *G06V 10/758* (2022.01); *G08G 1/096861* (2013.01); *G06V 10/759* (2022.01)

(58) Field of Classification Search
  CPC . G06T 7/174; G06T 7/00; G06T 2207/10028; G06T 2207/10016; G06T 7/74; G06T 7/12; G06K 9/6202; G06K 9/6212; G06K 2009/6213; G08G 1/096861; B60R 2300/302; B60R 2300/307; B60R 2300/70; B60R 2300/8086
  USPC ......................................................... 701/428
  See application file for complete search history.

(56) References Cited

U.S. PATENT DOCUMENTS

| | | | |
|---|---|---|---|
| 8,930,135 B2* | 1/2015 | Abramovich Ettinger ................. | G01C 21/3644 701/426 |
| 9,671,243 B2* | 6/2017 | Stein ................... | G01C 21/3644 |
| 9,709,986 B2 | 7/2017 | Gdalyahu et al. | |
| 2008/0137911 A1* | 6/2008 | Hautiere ................ | G06V 20/56 382/106 |
| 2010/0125406 A1* | 5/2010 | Prehofer ............ | G01C 21/3641 705/323 |
| 2014/0372020 A1* | 12/2014 | Stein .................. | G01C 21/3644 701/410 |
| 2015/0310313 A1 | 10/2015 | Murayama et al. | |
| 2017/0322043 A1* | 11/2017 | Stein .................. | G01C 21/3602 |
| 2018/0224296 A1 | 8/2018 | Suzuki et al. | |

FOREIGN PATENT DOCUMENTS

| | | |
|---|---|---|
| JP | 2014173956 A | 9/2014 |
| JP | 2016048238 A | 4/2016 |

OTHER PUBLICATIONS

Campani, M et al. "Visual Routines For Outdoor Navigation." Proceedings of the Intelligent Vehicles '93 Symposium. IEEE, 1993. 107-112. Web.*
Office Action for corresponding European Patent Application No. 19201734.1-1001, dated Feb. 14, 2020, 115 pages.
Yuan et al., "Combining Maps and Street Level Images for Building Height and Facade Estimation", Dec. 13, 2016, 8 pages.
Office Action for Related European Application No. 19201734.1 -1001, dated Mar. 17, 2021, 8 pages.
Wenig et al., "Pharos: Improving Navigation Instructions on Smartwatches by Including Global Landmarks", MobileHCI '17 Proceedings of the 19th International Conference on Human-Computer Interaction with Mobile Devices and Services, Published—2017, 13 pages.
Elias et al., "Automatic Generation and Application of Landmarks in Navigation Data Sets", Jan. 2005, In book: Developments in Spatial Data Handling, pp. 469-480.
Kalin et al., "A Study on Visibility Analysis of Urban Landmarks: the Case of Hagia Sophia (AYASOFYA) in Trabzon", METU Journal of the Faculty of Architecture 29(1), Jan. 2012, pp. 241-271.
First Examination Report for related Indian Patent Application No. 201811038113, dated Dec. 12, 2022, 8 pages.
Krukar et al., "Landmark-Based Navigation in Cognitive Systems", Mar. 31, 2017, pp. 121-124.

* cited by examiner

METHOD AND SYSTEM FOR GENERATING NAVIGATION DATA FOR A GEOGRAPHICAL LOCATION

CROSS-REFERENCES TO RELATED APPLICATIONS

This application claims priority from an Indian Patent Application Serial No. 201811038113, entitled "Method and System for Generating Navigation Data for a Geographical Location," filed on Oct. 8, 2018, the contents of which are hereby incorporated herein in their entirety by this reference.

FIELD OF THE PRESENT DISCLOSURE

The present disclosure generally relates to mapping and navigation applications, and more particularly relates to a method and a system for generating landmark based navigation data for a geographical location.

BACKGROUND

Various navigation applications are available to provide directions for driving, walking, or other modes of travel. Web sites and mobile systems offer map applications that allow a user to request directions from one point to another. Navigation devices based on Global Positioning System (GPS) technology have become common, and these systems are often used to provide directions to drivers, pedestrians, cyclists, and the like. Directions typically take the form of a list of instructions, where each of the instructions describes a turn to be made (or not to be made) at a particular intersection. However, quite often, directions may be difficult to follow. For example, the directions might say, "turn right on X-Street." However, it might be difficult for a traveler to identify X-Street, as the street sign might be missing, or the intersection might be confusing (e.g., if several roads intersect the traveler's current road very near to each other).

Landmark based navigation is the most natural way for humans to navigate through their environment. For example, if the traveler knows that there is a particular building at the X-Street, then the intersection may be easier to find when the intersection is described relative to that building. If the directions include a long stretch of road without a turn, then the traveler may become concerned that he or she may have missed a turn. Identifying landmarks along such a stretch of road may give the traveler confidence that he or she is still on the correct route. Thus, it is desirable to incorporate such landmark based navigation technique into personal navigation systems, which are nowadays based on distance and turn instructions.

Currently, landmark-based navigation data is manually created and stored in a navigation database for future access by a user. This includes, for example, the process of identifying landmarks by manually going through street level imagery for each source road and further calculating maximum distance from where the landmark is clearly visible (also referred to as "visibility distance"). Furthermore, the prepositions for each possible connecting roads from a given source road also need to be fed into the navigation database manually. For instance, services such as Google Maps® are capable of displaying street level images of geographic locations. These services, generally, employ various techniques to identify landmarks located in the street level images, for example, human operators may identify landmarks, images may be scanned using OCR in order to identify landmarks, or by matching images of known landmarks, such as real estate images, to the street level images.

Such manual processes for identifying the landmarks from the street images and further calculating the visibility distance are very time consuming and expensive. Furthermore, road geometries change with time in real world. New landmarks are also constructed which can be used to geocode additional navigation data. Since the currently employed manual processes for generating navigation data are extremely time consuming, it becomes challenging to create new or update existing landmark-based navigation data.

Accordingly, there is a need of a method and system for generating landmark based navigation data for a geographical location which is automated to most extent. Documents describing the closest subject matter provide for a number of more or less complicated features that fail to solve the problems described above in an efficient and economical way.

SUMMARY

The methods and systems disclosed herein provide end to end automation for generating landmark based navigation data without the need of any human intervention. The methods and systems disclosed herein provide for utilization of street images and geometry information to automatically identify potential landmarks and further derive visibility distance of the landmarks using computer vision and deep learning algorithms to successfully automate generation of the navigation data.

The methods and systems disclosed herein provide for lesser hardware requirements as compared to conventional systems, because the methods and systems disclosed herein lead to real time updating of the navigation data, such as in a navigation data related database, without the need of a vehicle surveying the area. Further, the methods and systems disclosed herein provide for reducing the complexity of the overall navigation system.

In one aspect, a computer-implemented method for generating navigation data for a geographical location is disclosed. The method comprises identifying at least one landmark located along a source road in the geographical location from a source image captured by an imaging device; segmenting the source image using a deep learning model to identify a segmentation mask; generating a template image based on the segmentation mask and a street image of the at least one landmark, wherein the street image comprises a 2D footprint of the at least one landmark falling within a field-of-view of the imaging device; matching the template image successively with a sequence of images of the at least one landmark to determine a confidence score for each image in the sequence of images; identifying a first image from the sequence of images whose confidence score is below a predetermined threshold; selecting a second image from the sequence of images, that is immediately preceding the first image in the sequence of images, wherein the confidence score of the second image is above the predetermined threshold; calculating a visibility distance of the at least one landmark based on the source image and the second image; and generating the navigation data based on the calculated visibility distance.

In one or more embodiments, the method further comprises determining a shape figure of the at least one landmark in the template image; determining a largest fitting rectangle fitting inside the shape figure; and matching the template image successively with the sequence of images of the at least one landmark based on the largest fitting rectangle.

In one or more embodiments, the largest fitting rectangle is a vertically fitting rectangle bounding maximum height of the shape figure.

In one or more embodiments, the sequence of images is captured by the imaging device from multiple points of view on the source road, wherein each of the sequence of images has at least a portion of the at least one landmark, and wherein a size of the at least one landmark corresponding to the at least portion is different in each of the sequence of images, and wherein the largest fitting rectangle is resized on the basis of the size of the at least one landmark in each of the sequence of images.

In one or more embodiments, the source image is segmented for detection and localization of the at least one landmark.

In one or more embodiments, the method further comprises detecting one or more potential landmarks located along the source road in the geographical location; and selecting the at least one landmark, for determining the visibility distance, having better visibility in the sequence of images among the one or more potential landmarks.

In one or more embodiments, the method further comprises determining one or more navigation routes from the source road to each of one or more connecting roads using the at least one landmark as a reference point and the visibility distance as a reference distance based on the generated navigation data; storing the determined one or more navigation routes; and performing a voice over process for providing turn-by-turn navigation instructions for the stored one or more navigation routes.

In one or more embodiments, the method further comprises recognizing one or more physical features of the at least one landmark from at least one of the sequence of images; and using the one or more recognized physical features of the at least one landmark as one or more references in the one or more navigation routes.

In one or more embodiments, a discernible color of the at least one landmark is recognized from at least one of the sequence of images utilizing prominent pixel intensities techniques.

In another aspect, a system for generating navigation data of a geographical location is disclosed. The system comprises at least one database configured to store a sequence of images of at least one landmark located along a source road in the geographical location. The system further comprises a computing arrangement configured to identify at least one from a source image captured by an imaging device; segment the source image using a deep learning model to identify a segmentation mask; generate a template image based on the segmentation mask and a street image of the at least one landmark, wherein the street image comprises a 2D footprint of the at least one landmark falling within a field-of-view of the imaging device; match the template image successively with the sequence of images to determine a confidence score for each image in the sequence of images identify a first image from the sequence of images whose confidence score is below a predetermined threshold; select a second image from the sequence of images, that is immediately preceding the first image in the sequence of images, wherein the confidence score of the second image is above the predetermined threshold; calculate a visibility distance of the at least one landmark based on the source image and the second image; and generate the navigation data based on the calculated visibility distance.

In one or more embodiments, the computing arrangement is further configured to determine a shape figure of the at least one landmark in the template image; determine a largest fitting rectangle fitting inside the shape figure; and match the template image successively with the sequence of images based on the largest fitting rectangle.

In one or more embodiments, the largest fitting rectangle is a vertically fitting rectangle bounding maximum height of the shape figure.

In one or more embodiments, the imaging device is configured to capture the sequence of images from multiple points of view on the source road, wherein each of the sequence of images has at least a portion of the at least one landmark, and wherein a size of the at least one landmark corresponding to the at least portion is different in each of the sequence of images, and wherein the largest fitting rectangle is resized on the basis of the size of the at least one landmark in each of the sequence of images.

In one or more embodiments, the source image is segmented for detection and localization of the at least one landmark.

In one or more embodiments, the computing arrangement is further configured to detect one or more potential landmarks located along the source road in the geographical location; and select the at least one landmark, for determining the visibility distance, having better visibility in the sequence of images among the one or more potential landmarks.

In one or more embodiments, the computing arrangement is further configured to determine one or more navigation routes from the source road to each of one or more connecting roads using the at least one landmark as a reference point and the visibility distance as a reference distance based on the generated navigation data; store the determined one or more navigation routes; and perform a voice over process for providing turn-by-turn navigation instructions for the stored one or more navigation routes.

In one or more embodiments, the computing arrangement is further configured to recognize one or more physical features of the at least one landmark from at least one of the sequence of images; and use the one or more recognized physical features of the at least one landmark as one or more references in the one or more navigation routes.

In one or more embodiments, a discernible color of the at least one landmark is recognized from at least one of the sequence of images utilizing prominent pixel intensities techniques.

In yet another aspect, a computer program product comprising at least one non-transitory computer-readable storage medium having computer-executable program code instructions stored therein, the computer-executable program code instructions comprising program code instructions to identify at least one landmark located along a source road in the geographical location from a source image captured by an imaging device; segment the source image using a deep learning model to identify a segmentation mask; generate a template image based on the segmentation mask and a street image of the at least one landmark, wherein the street image comprises a 2D footprint of the at least one landmark falling within a field-of-view of the imaging device; match the template image successively with a sequence of images of the at least one landmark to determine a confidence score for each image in the sequence of images; identify a first image from the sequence of images whose confidence score is below a predetermined threshold; select a second image from the sequence of images, that is immediately preceding the first image in the sequence of images, wherein the confidence score of the second image is above the predetermined threshold; calculate a visibility distance of the at least one landmark based on the source image and the second image; and generate the navigation data based on the calculated visibility distance.

In one or more embodiments, the computer-executable program code instructions further comprise program code instructions to determine a shape figure of the at least one landmark in the template image; determine a largest fitting rectangle fitting inside the shape figure; and match the template image successively with the sequence of images of the at least one landmark based on the largest fitting rectangle. The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, apparatuses and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present disclosure. Further, it is to be understood that the phraseology and terminology employed herein are for the purpose of the description and should not be regarded as limiting. Any heading utilized within this description is for convenience only and has no legal or limiting effect.

Figure 1:
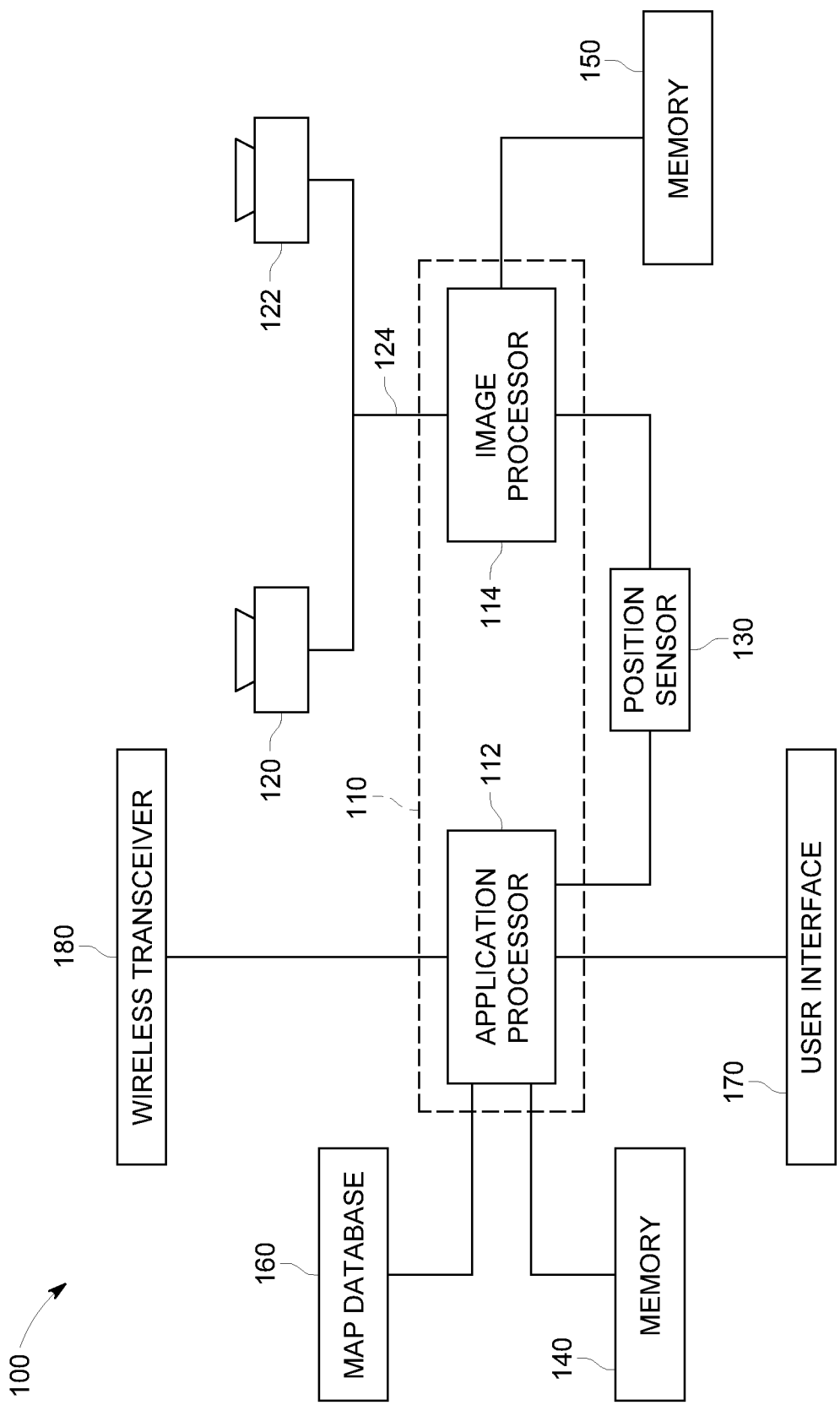
FIG. 1 illustrates a schematic block diagram of a system for generating navigation data, in accordance with one or more example embodiments.

FIG. 1 illustrates a block diagram representation of a system (generally referred by the numeral 100) consistent with the exemplary disclosed embodiments. The system 100 may include various components depending on the requirements of a particular implementation. In one or more embodiments, the system 100 may include a computing arrangement 110, a position sensor 130, one or more memory units 140, 150, a map database 160, a user interface 170, and a wireless transceiver 180. In some example embodiments, an imaging device 120 may be provided as external to the system. In other embodiments, the imaging device 120 may be provided as a part of the system. The computing arrangement 110 may include one or more processing devices. In one example, the computing arrangement 110 may include an application processor 112, an image processor 114, or any other suitable processing device required for functioning of the system 100. Similarly, the imaging device 120 may include any number of image capturing units and components depending on the requirements of a particular application with the system 100 of the present disclosure.

While FIG. 1 depicts two separate processing devices included in the computing arrangement 110, more or fewer processing devices may be used. For example, in some embodiments, a single processing device may be used to accomplish the tasks of the application processor 112 and the image processor 114. In other examples, these tasks may be performed by more than two processing devices. Both the application processor 112 and the image processor 114 may include various types of processing devices. For example, either or both of the application processor 112 and the image processor 114 may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some embodiments, the application processor 112 and/or the image processor 114 may include any suitable type of single or multi-core processor, microcontroller, central processing unit, etc. Various processing devices may be used, including, for example, processors available from manufacturers such as Intel®, AMID®, etc. and may include various architectures (e.g., x86 processor, ARM®, etc.).

Any of the processing devices disclosed herein may be configured to perform certain functions. Configuring a processing device, such as any of the described processors, controllers or microprocessor, to perform certain functions may include programming of computer executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

In the present examples, the imaging device 120 is an image acquisition unit, such as a camera. The imaging device 120 may include any suitable type and number of image sensors, including CCD sensors or CMOS sensors, for example. Further, the imaging device 120 may have any suitable resolution capability (e.g., number of pixels associated with the image sensor). The imaging device 120 is configured to capture images encompassing area within a field-of-view (FOV) thereof. The FOV associated with the imaging device 120 may depend on the corresponding focal length. For example, as the focal length increases, the corresponding field of view decreases. The imaging device 120 may include one or more lenses, for example, to provide a suitable focal length to achieve the desired FOV. In one example, the imaging device 120 may be associated with a 6 mm lens or a 12 mm lens. To overcome any lens distortion, the imaging device 120, in some implementations, may use a radially symmetric lens. In some examples, the focal length associated with the imaging device 120 may be selectable (e.g., by inclusion of appropriate lenses etc.) such that the imaging device 120 acquires images of objects at a desired distance range. For example, the imaging device 120 may acquire images of close-up objects within a few meters therefrom, and may further be configured to acquire images of objects at larger distances therefrom (e.g., 25 m, 50 m, 100 m, 150 m, or more).

Figure 2:
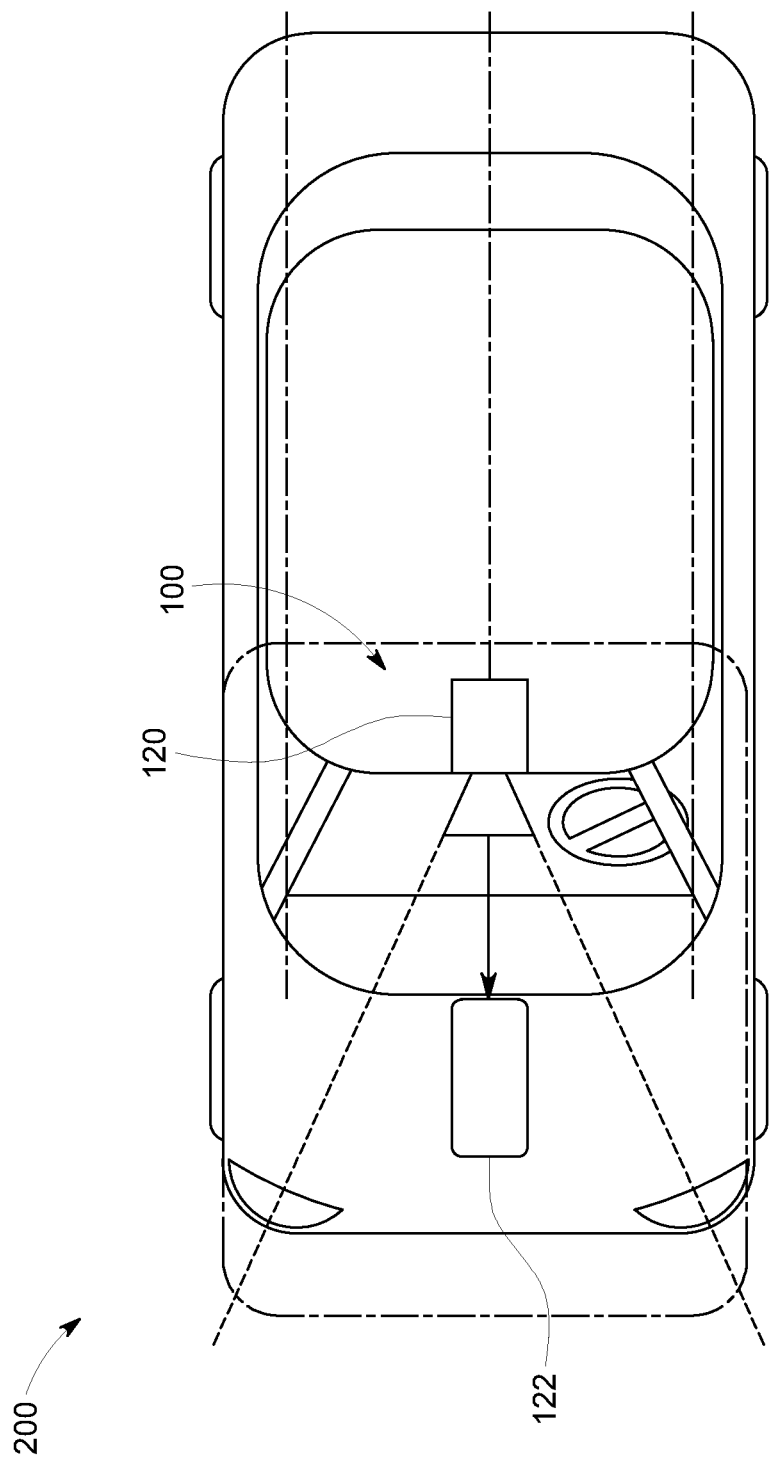
FIG. 2 illustrates a diagrammatic view of a vehicle to be employed with the system of FIG. 1, in accordance with one or more example embodiments.

According to some embodiments, the FOV of the imaging device 120 may have a wide angle, since the imaging device 120 may be employed to capture images of a wide geographical area in the vicinity thereof (as will be discussed later). For example, FIG. 2 illustrates an embodiment in which the imaging device 120 is mounted on a vehicle 200, and the imaging device 120 may be used to capture images of the area to the right or left of the vehicle 200. In such cases, it may be desirable for the imaging device 120 to have a wide FOV (e.g., at least 140 degrees). In other examples, the imaging device 120 may include multiple cameras whose output images are combined or stitched together using known algorithms to generate final images with a desired FOV required for operation of the system 100.

The system 100 may also include a distance measuring device 122. In the present examples, the distance measuring device 122 includes a LIDAR (Light Detection and Ranging). The distance measuring device 122 may be configured to measure a distance thereof from an object, like a building, in direct line-of-sight thereof. The distance measuring device 122 may work in coordination and synchronization with the imaging device 120 to determine distances of objects in an image captured by the imaging device 120. For this purpose, the distance measuring device 122 may be configured to have substantially same FOV as the imaging device 120, and also be electrically connected to the image processor 114, like the imaging device 120. FIG. 2 depicts the distance measuring device 122 mounted on the vehicle 200 and arranged with respect to the imaging device 120 so as to have a substantially same line-of-sight as the imaging device 120.

The system 100 may also include a data interface 124 communicatively connecting the computing arrangement 110, or specifically the image processor 114, to the imaging device 120. Further, as illustrated, the data interface 124 communicatively connects the distance measuring device 122 to the image processor 114. The data interface 124 may include any wired and/or wireless link or links for transmitting image data acquired by the imaging device 120 to the image processor 114.

The position sensor 130 may include any type of device suitable for determining a location associated with at least one component of the system 100. In some embodiments, the position sensor 130 may include a GPS receiver. Such receivers can determine a user's position and velocity by processing signals broadcasted by global positioning system satellites. Position information from the position sensor 130 may be made available to the application processor 112 and/or the image processor 114, in the computing arrangement 110.

The memory units 140, 150 may store software that, when executed by the computing arrangement 110, controls the operation of the system 100. In particular, the memory units 140, 150 may include databases and image processing algorithms. The memory units 140, 150 may comprise any number of random access memories, read only memories, flash memories, disk drives, optical storage, tape storage, removable storage and other types of storage. In one instance, the memory may be separate from the computing arrangement 110. In another instance, the memory units 140, 150 may be integrated into the computing arrangement 110.

The map database 160 may include any type of database for storing map data useful to the system 100. In some embodiments, the map database 160 may include data relating to the position, in a reference coordinate system, of various items, including roads, geographic features, businesses, and landmarks (or points of interest) like restaurants, gas stations, etc. in any particular geographical location. The map database 160 may store not only the locations of such items, but also descriptors relating to those items, including, for example, names associated with any of the stored items, such as name of a building. In some examples, the map database 160 may be physically located along with other components of system 100. Alternatively, or additionally, the map database 160 may, at least in part, be located remotely with respect to other components of the system 100 (e.g., the computing arrangement 110). In such embodiments, information from the map database 160 may be downloaded over a wired or wireless data connection to a network (e.g., over a cellular network and/or the Internet, etc.), using the wireless transceiver 180.

The user interface 170 may include any device suitable for providing information to or for receiving inputs from one or more users of the system 100. In some examples, the user interface 170 may include user input devices, including, for example, a touchscreen, microphone, keyboard, pointer devices, track wheels, cameras, knobs, buttons, etc. With such input devices, a user may be able to provide information inputs or commands to the system 100 by typing instructions or information, providing voice commands, selecting menu options on a screen using buttons, pointers, or eye-tracking capabilities, or through any other suitable techniques for communicating information to the system 100. The user interface 170 may be equipped with one or more processing devices configured to provide and receive information to or from a user and process that information for use by, for example, the application processor 112. Such processing devices may execute instructions for recognizing and tracking eye movements, receiving and interpreting voice commands, recognizing and interpreting touches and/or gestures made on a touchscreen, responding to keyboard entries or menu selections, etc. In some examples, the user interface 170 may include a display, one or more speakers, a tactile device, and/or any other devices for providing output information to the user.

In one or more examples, the wireless transceiver 180 may include one or more devices configured to exchange transmissions over an air interface to one or more networks (e.g., cellular, the Internet, etc.) by use of a radio frequency, infrared frequency, magnetic field, or an electric field. The wireless transceiver 180 may use any known standard to transmit and/or receive data, such as, but not limited to, Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. A CDMA network may implement a radio technology such as Universal Terrestrial Radio Access (UTRA), CDMA2000, etc. UTRA includes Wideband CDMA (W-CDMA). CDMA2000 covers IS-2000, IS-95 and technology such as Global System for Mobile Communication (GSM).

Figure 3:
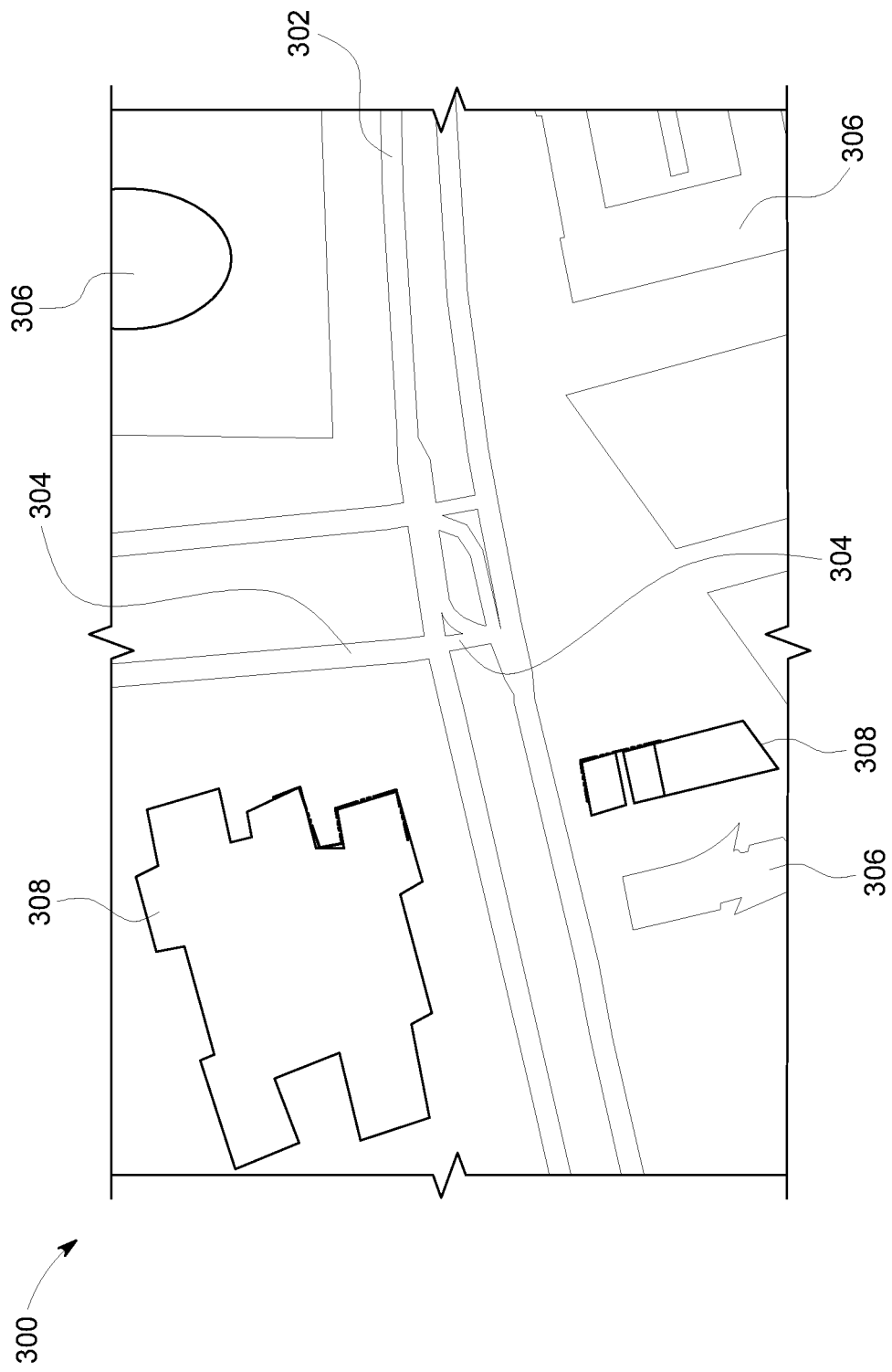
FIG. 3 depicts a satellite view of a geographical location for which the navigation data is to be generated, in accordance with one or more example embodiments.

The system 100 of the present disclosure is implemented for generating navigation data of a geographical location, such as a geographical location 300 as shown in FIG. 3. Herein, the geographical location 300 may be any location with one or more roads crossing each other. For example, the geographical location 300 may include a source road 302 and one or more connecting roads 304 which may be connected to the source road 302 at different locations. In the illustration of FIG. 3, the geographical location 300 is shown to have two connecting roads 304 located on opposite sides of the source road 302. The navigation data, herein, may refer to turn-by-turn navigation route(s) related data for enabling a user to travel from the source road 302 to at least one of the connecting roads 304 which may lead to a destination of the user. The system 100 of the present disclosure is configured to utilize locations of one or more landmarks, such as landmarks 306 shown in FIG. 3, located along the source road 302 for generating the navigation data for the geographical location 300. In particular, the system 100 utilizes one or more landmarks 306 located adjacent or nearby to the at least one of the connecting roads 304 in the geographical location 300. Herein, the landmarks 306 may refer to any points-of-interests or objects, such as, but not limited to, buildings, sculptures, fountains, historical monuments, gas stations, pharmacies, etc. in a particular geographical location. The landmarks 306 are also sometimes referred to as "Most Prominent Features" (MPF) or "points-of-interests" (POI) in the mapping industry, and the same terminology has been used herein.

For the purpose of generating navigation data, the vehicle 200 with components of the system 100 installed thereon may be configured to travel on the source road 302 in the geographical location 300 in order for the system 100 to gather required information for generating the navigation data. In some example embodiments, the vehicle 200 may be configured for traveling on the source road 302 at least once in advance of the actual navigation requirement.

In some other example embodiments, the vehicle 200 may be configured for traveling on the source road in real-time, such as during the navigation operation itself for gathering data for turn-by-turn navigation route planning. It may be understood that the vehicle 200 may have a human driver who may drive the vehicle 200 for controlling speed, acceleration, direction of travel, etc. thereof, in order to allow the system 100 to properly gather the required information. In other examples, the vehicle 200 may be an autonomous or a semi-autonomous vehicle which may receive instructions from the system 100 related to speed, acceleration, direction of travel, etc. thereof, and thereby the vehicle 200 travels on the source road 302 in a manner for the system 100 to properly gather the required information.

Figure 4:
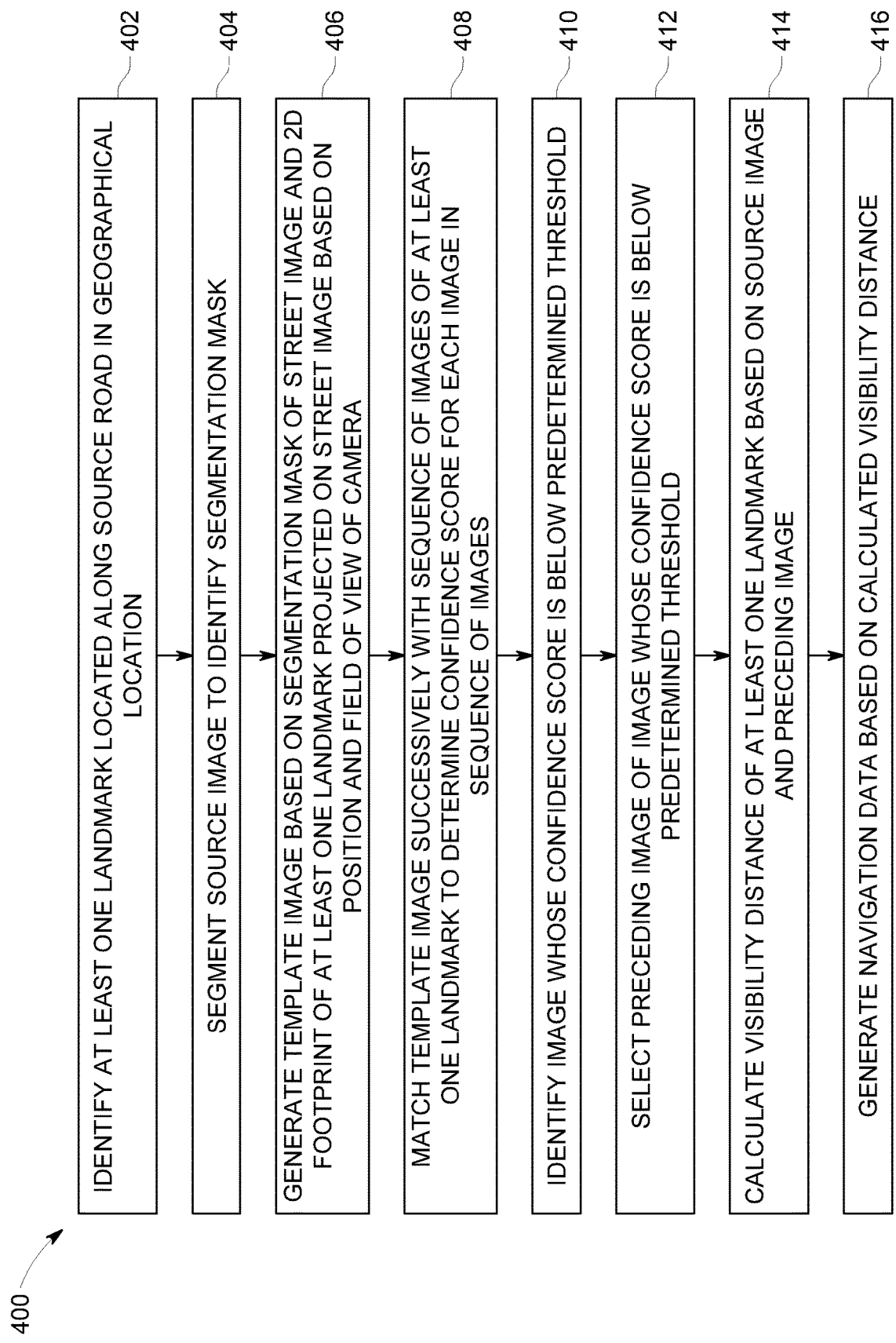
FIG. 4 illustrates a flowchart depicting steps in a method for generating the navigation data, in accordance with one or more example embodiments.

FIG. 4 illustrates a flowchart of a computer-implemented method 400 listing the various steps involved for generating the navigation data for the geographical location 300. Although herein the method 400 has been explained in terms of its implementation by components and devices of the system 100 of the present disclosure, it may be contemplated that, in other embodiments, the method 400 may be implemented using other types of components and devices arranged in some other fashion without any limitations. The steps involved in the method 400 may be performed in the given sequence or some other sequence without affecting the scope of the present disclosure.

At step 402, at least one landmark 308 located along the source road 302 in the geographical location 300 is identified. Herein, the at least one landmark 308 is at least one of the one or more landmarks 306 in the geographical location 300 which could possibly be utilized as a reference in the navigation data. For this purpose, firstly, one or more candidate landmarks located along the source road 302 are identified. Only those landmarks 306 in the geographical location are considered or selected to be candidate landmarks which have the one or more connecting roads 304, for which the navigation routes need to be generated, in the vicinity thereof (preferably within a radius of few meters). In some example embodiments, only those landmarks 306 in the geographical location may be considered whose 2D footprint image is not obstructed by 2D footprint images of other landmarks in the FOV of the imaging device 120. For such purpose, the application processor 112, in the computing arrangement 110 of the system 100, may utilize map content of the geographical location 300 available from, for example, the map database 160, including latitude and longitude coordinates of various objects, including the candidate landmarks as well as the source road 302 and the one or more connecting roads 304, geometry information of the source road 302 and the one or more connecting roads 304, 2D footprint images of landmarks 306 located along the source road 302 and the like.

In one embodiment, the computing arrangement 110 may utilize the map content to identify the at least one landmark 308 from the one or more candidate landmarks. The computing arrangement 110 may select any one of candidate landmarks to be the at least one landmark 308 if that candidate landmark is located in vicinity to intersection of the source road 302 and the connecting road 304 for which the navigation route needs to be generated (hereinafter simply referred to as connecting road 304). It may be contemplated by a person skilled in the art that the application processor 112 may process/analyze the map content of the geographical location 300 to identify the at least one candidate landmark with coordinates closest to coordinates of the intersection as compared to other candidate landmarks, and use that as the at least one landmark 308 from the one or more landmarks 306.

Figure 5:
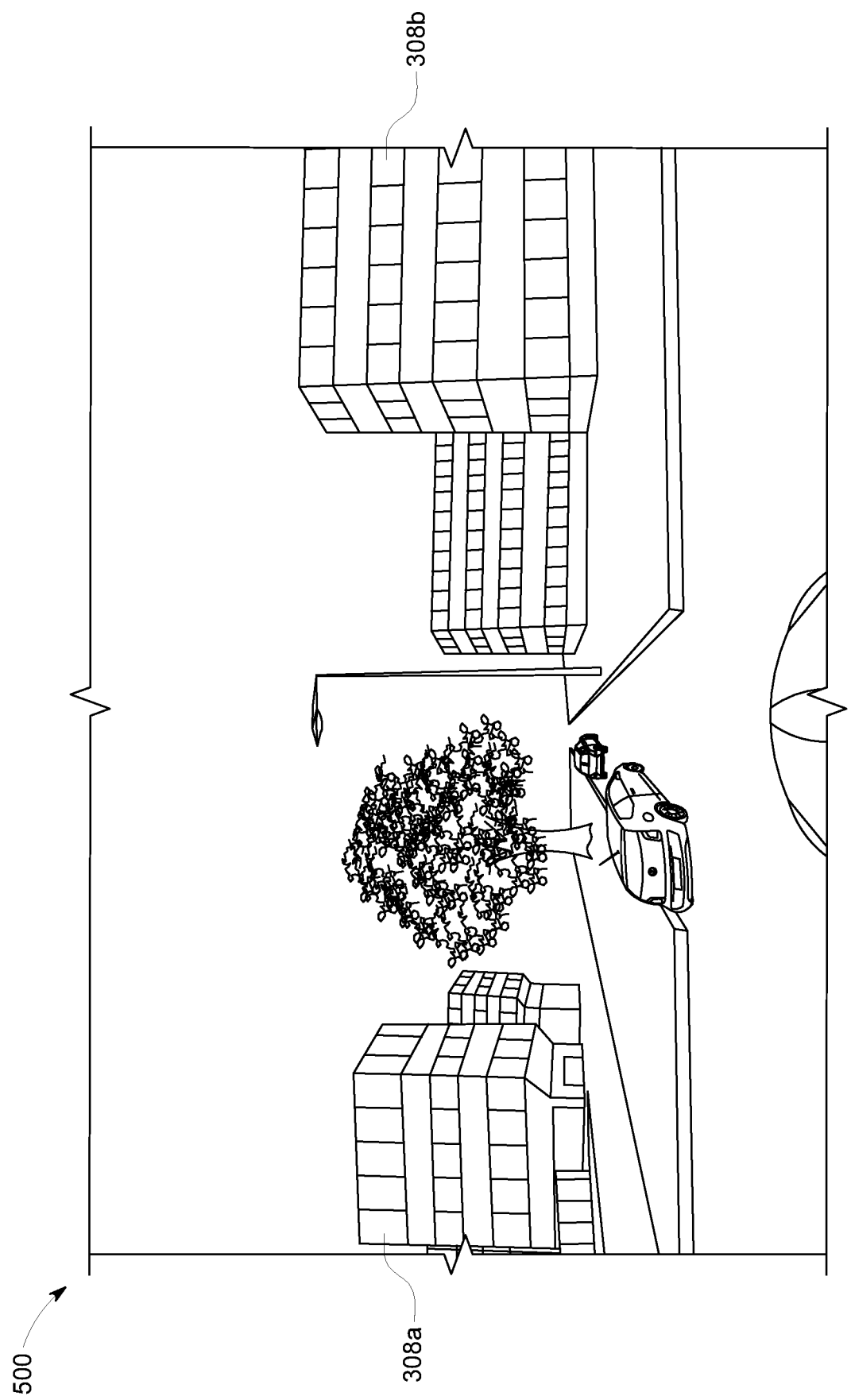
FIG. 5 depicts a street view of the geographical location, in accordance with one or more example embodiments.

In another embodiment, the image processor 114, in the computing arrangement 110, may configure the imaging device 120 to capture a source image 500 (as shown in FIG. 5) which encompasses at least portions of one or more landmarks 306 in the geographical location 300. The source image 500 is captured when the vehicle 200 is travelling along the source road 302 with the imaging device 120 pointed in a manner such that at least some portions of the one or more landmarks 306 is in FOV of the imaging device 120. It may be contemplated by a person skilled in the art that the computing arrangement 110 may implement image segmentation techniques known in the art on the source image 500 to detect and distinguish the one or more landmarks 306 from other objects in the geographical location 300. The computing arrangement 110, may then, identify the at least one landmark 308 from the source image 500 based on proximity of the at least one landmark 308 from the connecting road 304 for which the navigation route needs to be determined. In the present examples, as illustrated in FIG. 5, two landmarks including a first landmark 308a and a second landmark 308b (hereinafter, collectively referred to as landmarks 308 and further, sometimes, interchangeably referred to as potential landmarks 308) have been identified in the geographical location 300 to be utilized for generating the navigation data, in accordance with one or more embodiments of the present disclosure.

In an embodiment, the source image 500 is, generally, a nearest street-level image of the landmarks 308. In one example, the source image 500 is determined by calculating a distance between the 2D footprint of the one or more landmarks 306 and the coordinates of the vehicle 200, as determined by the position sensor 130 at the time of capturing of images of the street by the imaging device 120.

Figure 6:
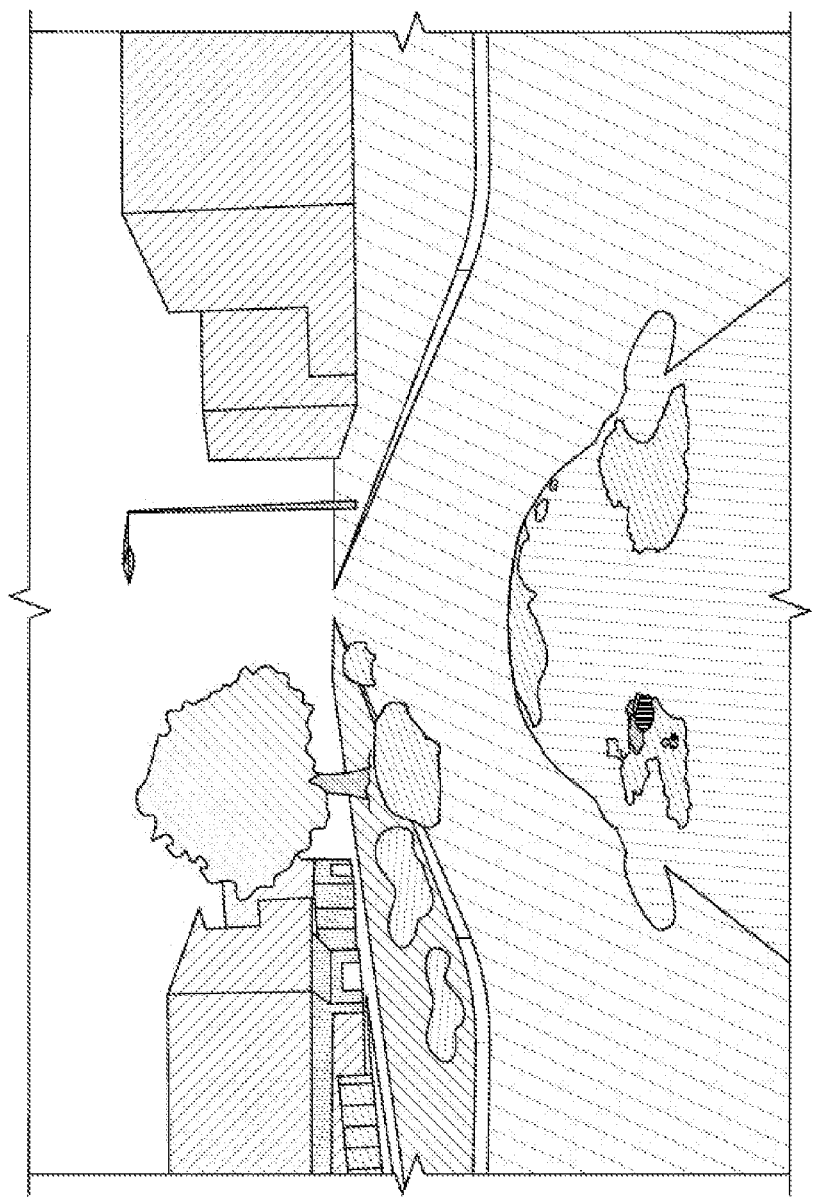
FIG. 6 depicts a segmentation mask of the geographical location, in accordance with one or more example embodiments.

At step 404, the source image 500 is segmented using a deep learning model to identify a segmentation mask 600 (as shown in FIG. 6). The segmentation mask 600 is generated by segmenting image pixels of the source image 500 into multiple classes like, buildings, roads, vegetation, pedestrians, cars, bikes, road markings, pole like objects, etc. As illustrated in FIG. 6, the image pixels which are part of buildings are marked with slanting line patterns, vegetation is marked with reverse slanting line patterns, road is marked with a different pattern and so forth. In some embodiments, different image pixels of the source image 500 may be colored differently. In one or more embodiments, the source image 500 is segmented for detecting and localizing the landmarks 308. Herein, the deep learning model may be implemented by a neural network which is trained using an existing set of manually annotated images and evolved until a desired segmentation accuracy is achieved.

Figure 7:
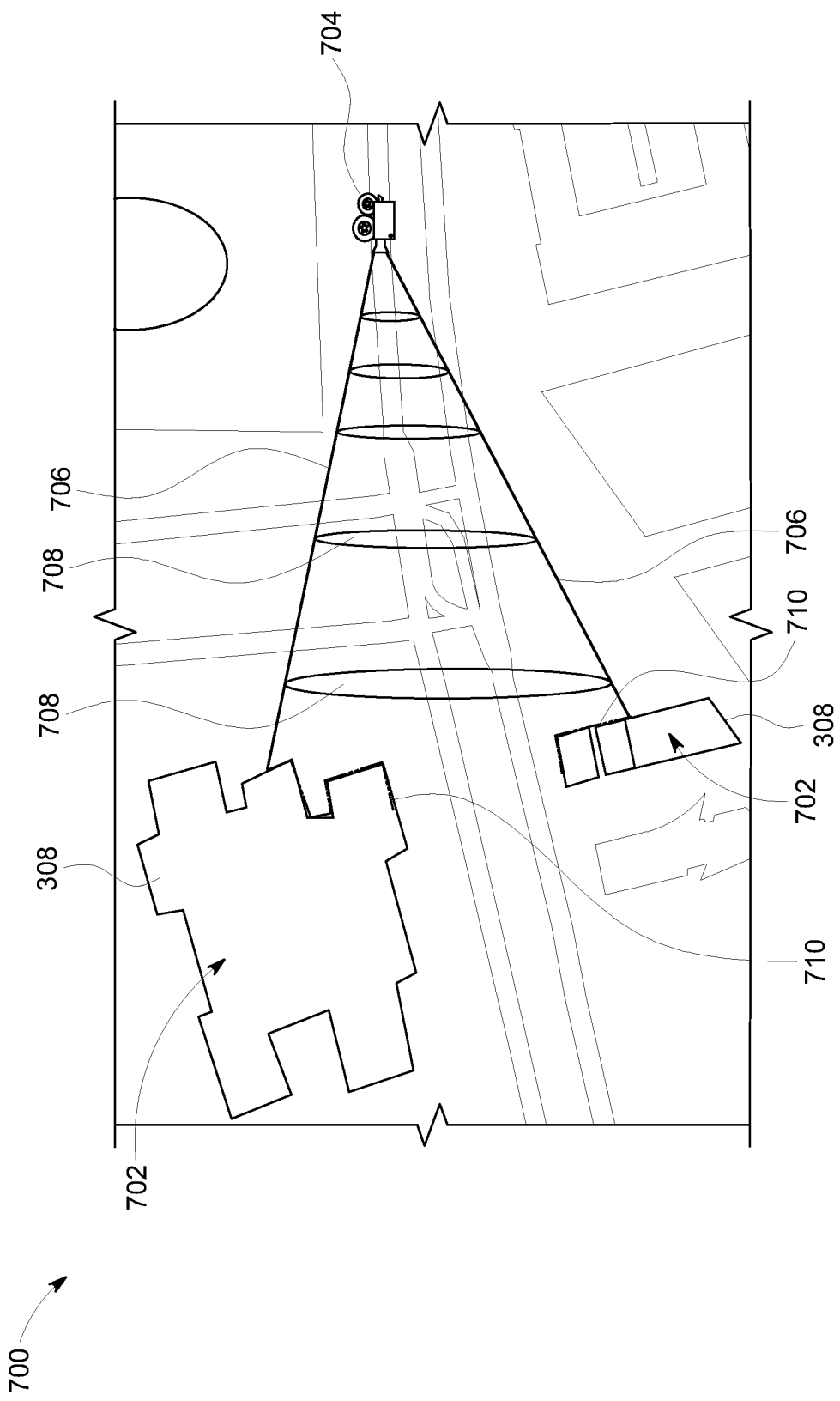
FIG. 7 depicts a 2D footprint of the street image of the geographical location, in accordance with one or more example embodiments.
Figure 8:
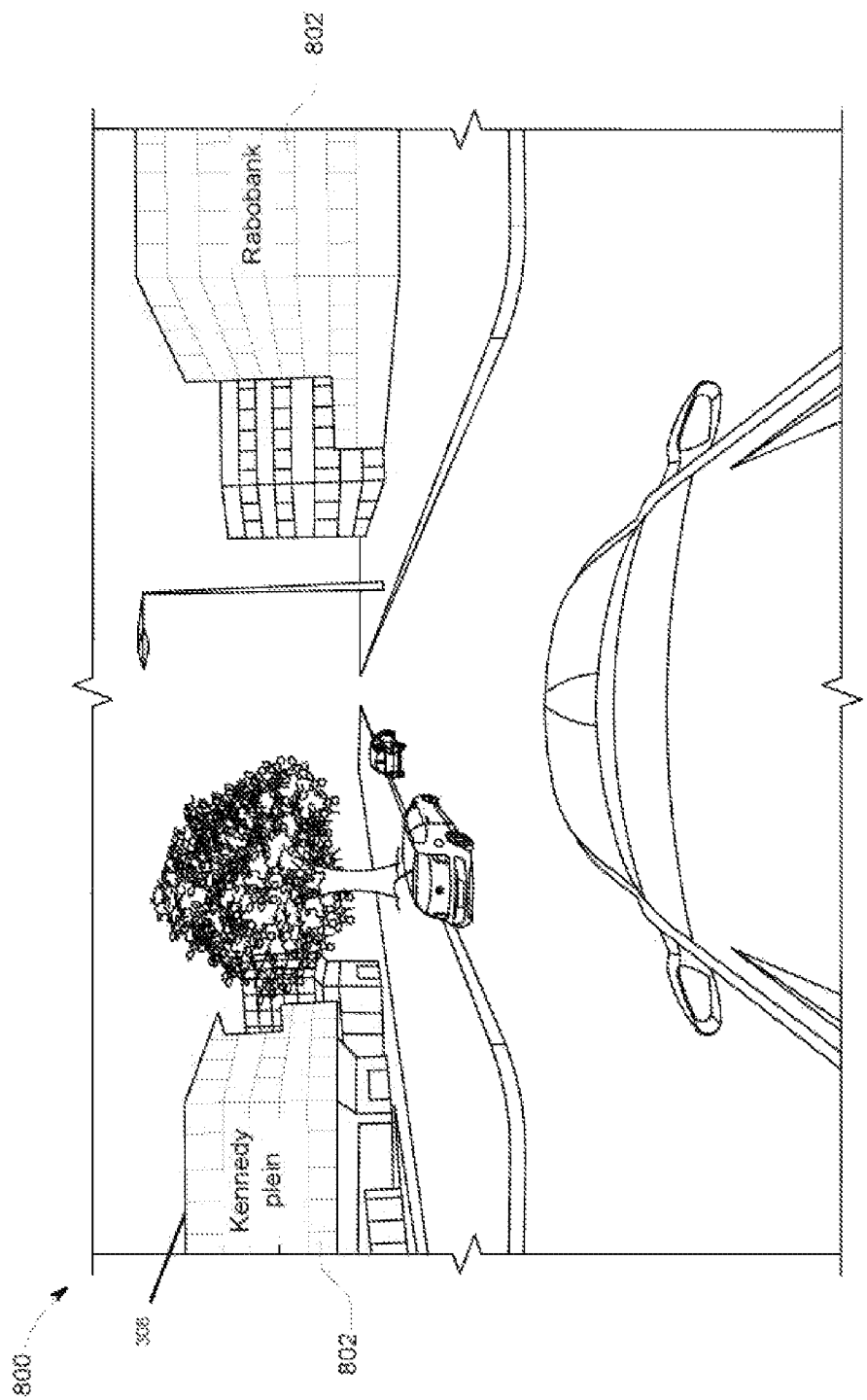
FIG. 8 depicts a street view of the geographical location overlaid with a segmentation mask, in accordance with one or more example embodiments.

At step 406, a template image is generated based on the segmentation mask 600 and a street image, such as a street image 700 (as shown in FIG. 7) of the geographical location 300 encompassing the landmarks 308 therein. In some examples, the street image 700 may be a satellite image of the geographical location 300 comprising a two-dimensional (2D) footprint of the landmarks 308 falling within the FOV of the imaging device 120. For this purpose, areas 702 corresponding to footprint polygons of the landmarks 308 are determined, by the computing arrangement 110. In FIG. 7, a camera icon 704 represents a location of the imaging device 120 from where the source image 500 has been taken. The area falling within lines 706 projecting from the imaging device 120 is indicative of the FOV, as represented by various ellipses 708, of the imaging device 120. The computing arrangement 110 may identify portions of the footprint polygons of the landmarks 308 which fall under the FOV (as highlighted with lines 710 in FIG. 7). The identified portions of the landmarks 308 are then projected back on the source image 500 using projective geometry. Faces of the landmarks 308 are then generated using random walk by walking through the image pixels corresponding to the buildings in that area of the segmentation mask 600, which corresponds to the landmarks 308 in the source image 500. FIG. 8 provides a visualization of the template image 800 with an overlay of the segmentation mask 600 over the source image 500 with the faces 802 of the landmarks 308 highlighted for reference purposes.

Figure 9:
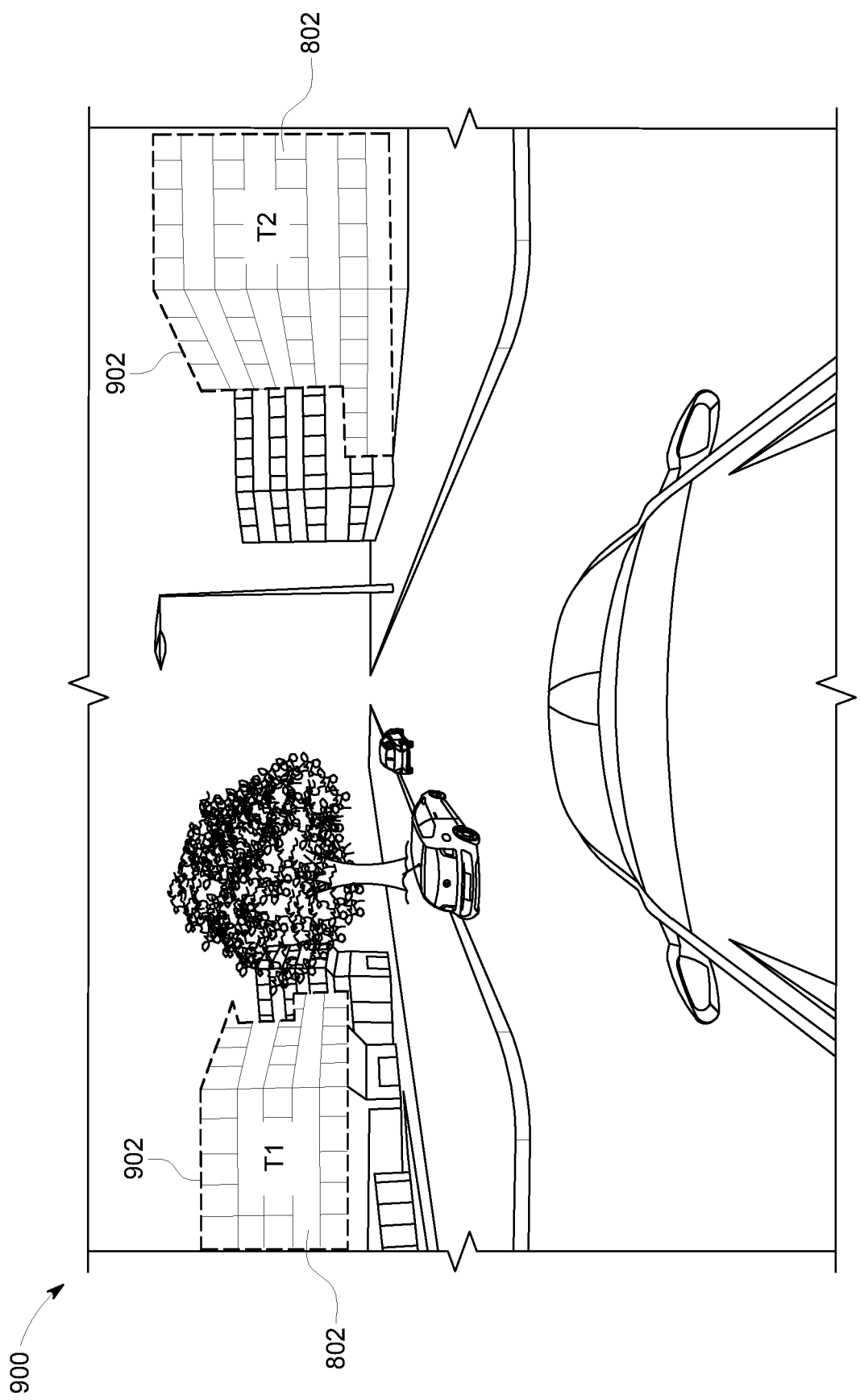
FIG. 9 depicts a street view of the geographical location, in accordance with one or more example embodiments.
Figure 10:
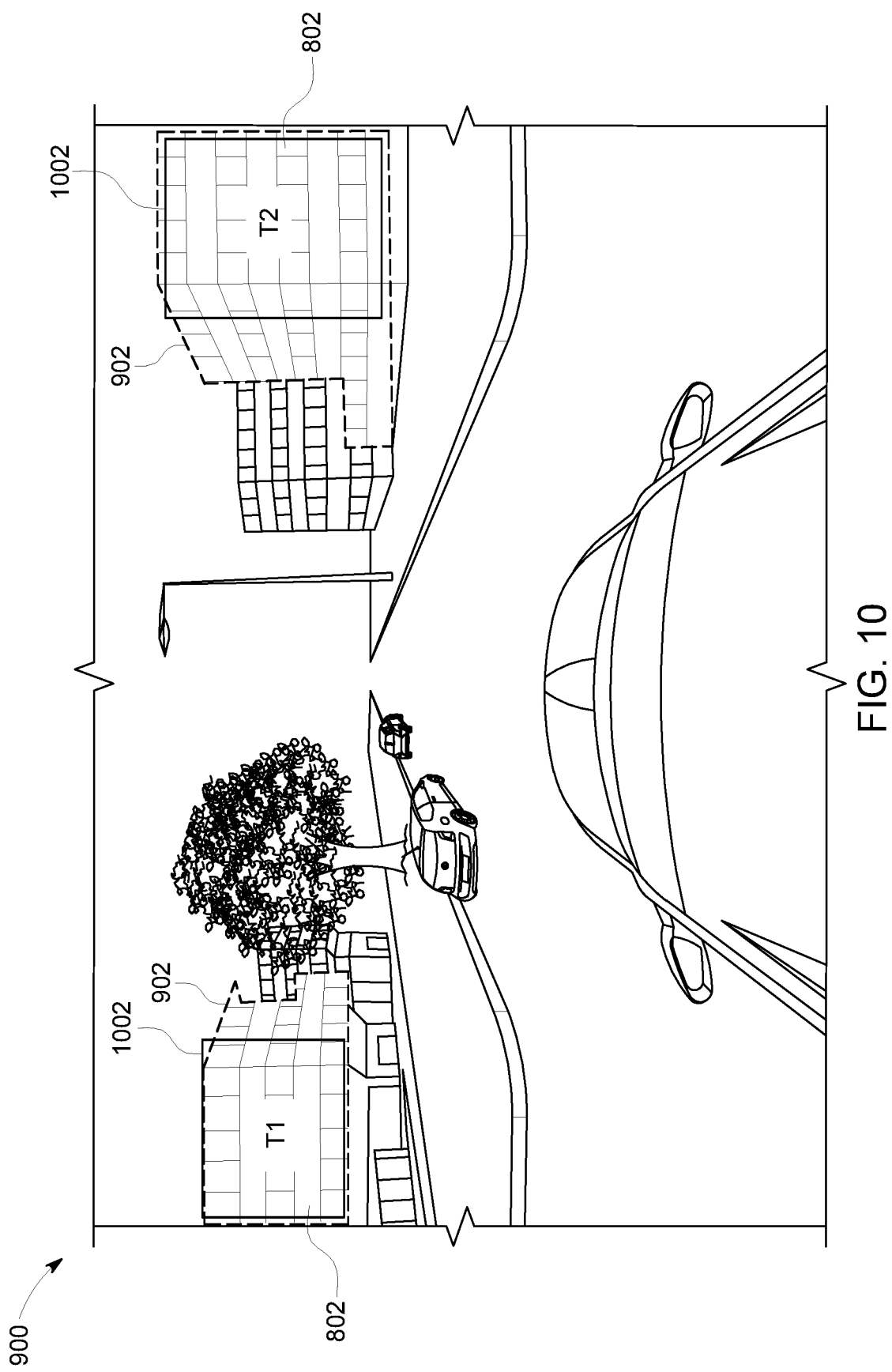
FIG. 10 depicts a street view of the geographical location, in accordance with one or more example embodiments.
Figure 11:
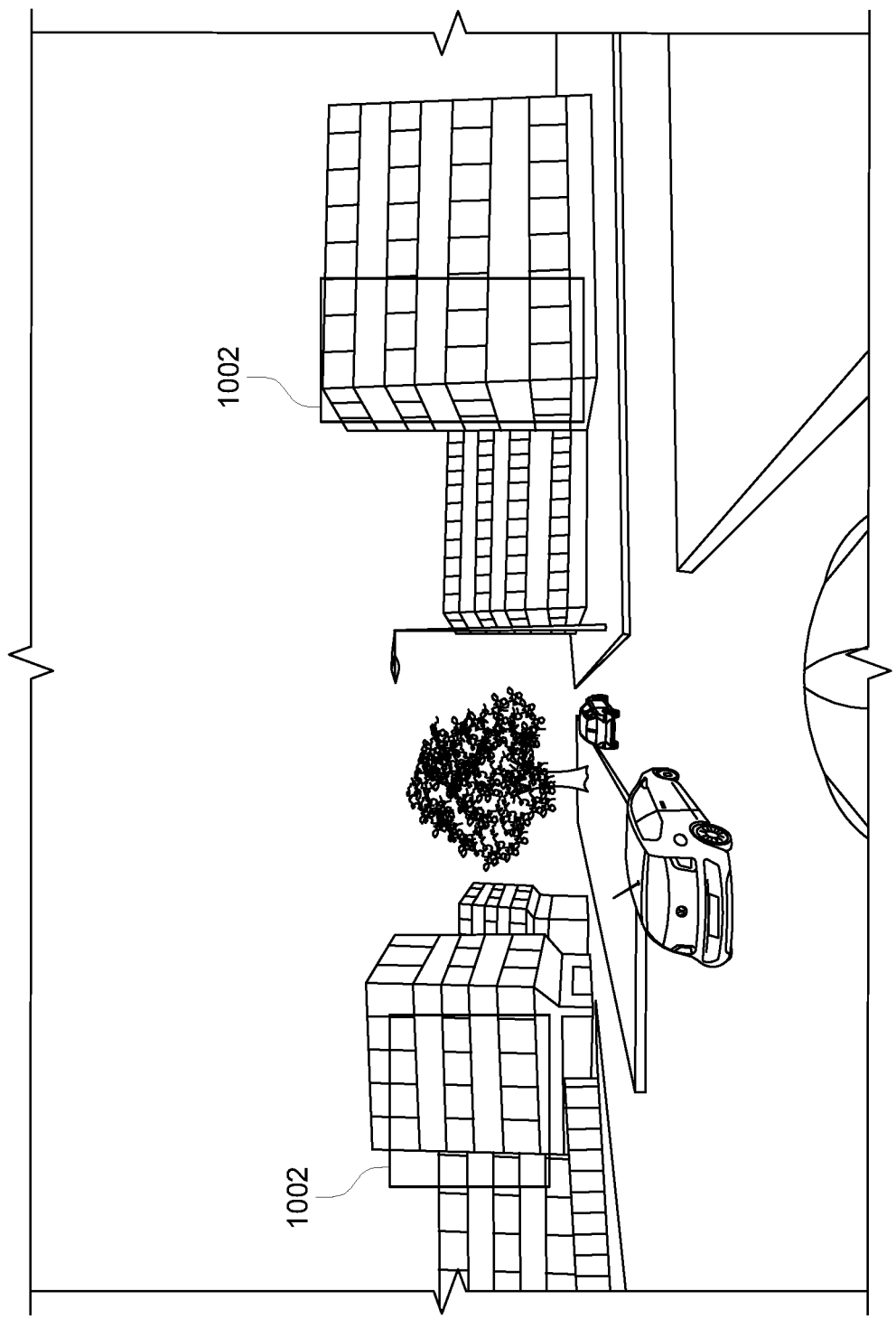
FIG. 11 depicts a street view of the geographical location, in accordance with one or more example embodiments.
Figure 12:
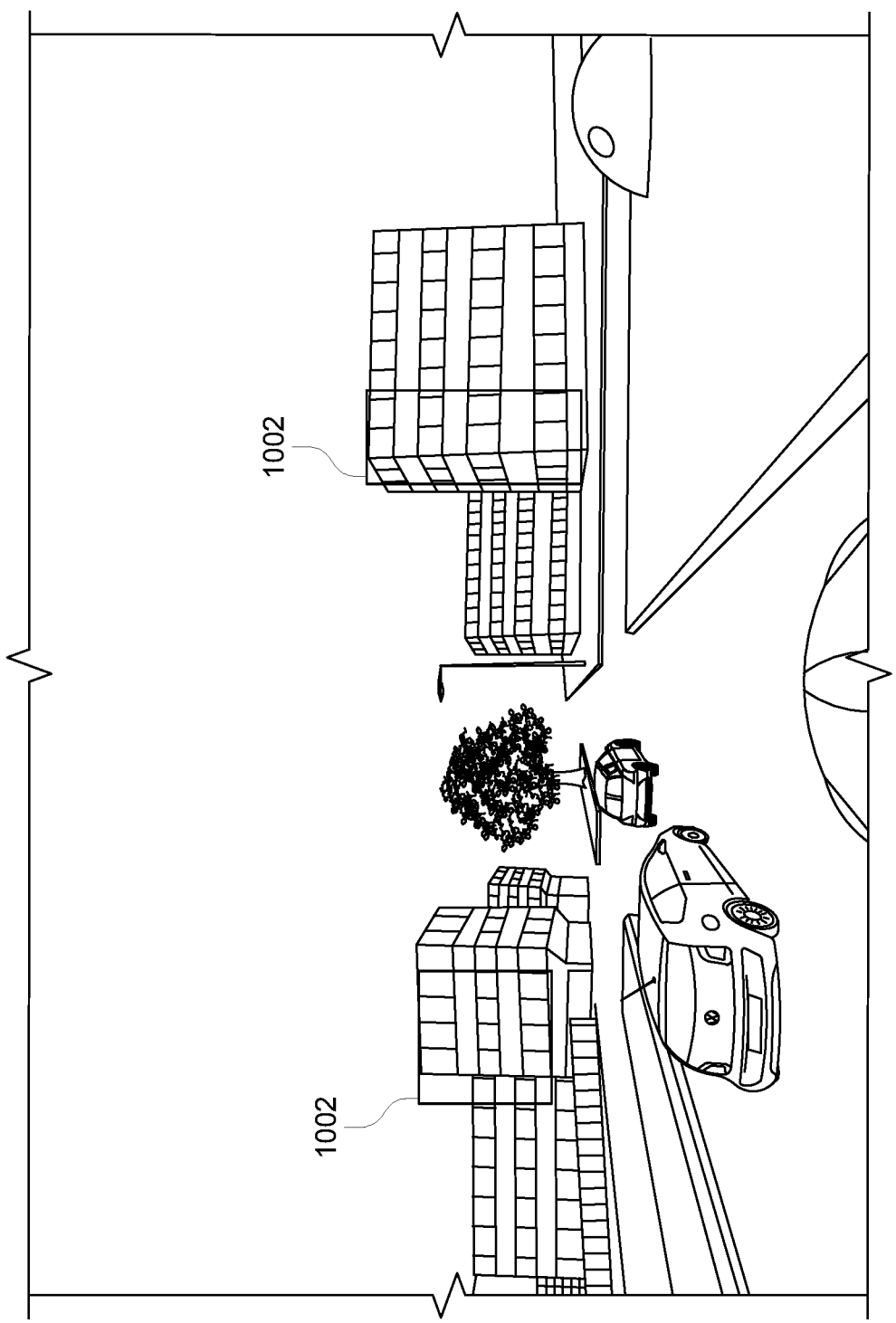
FIG. 12 depicts a street view of the geographical location, in accordance with one or more example embodiments.
Figure 13:
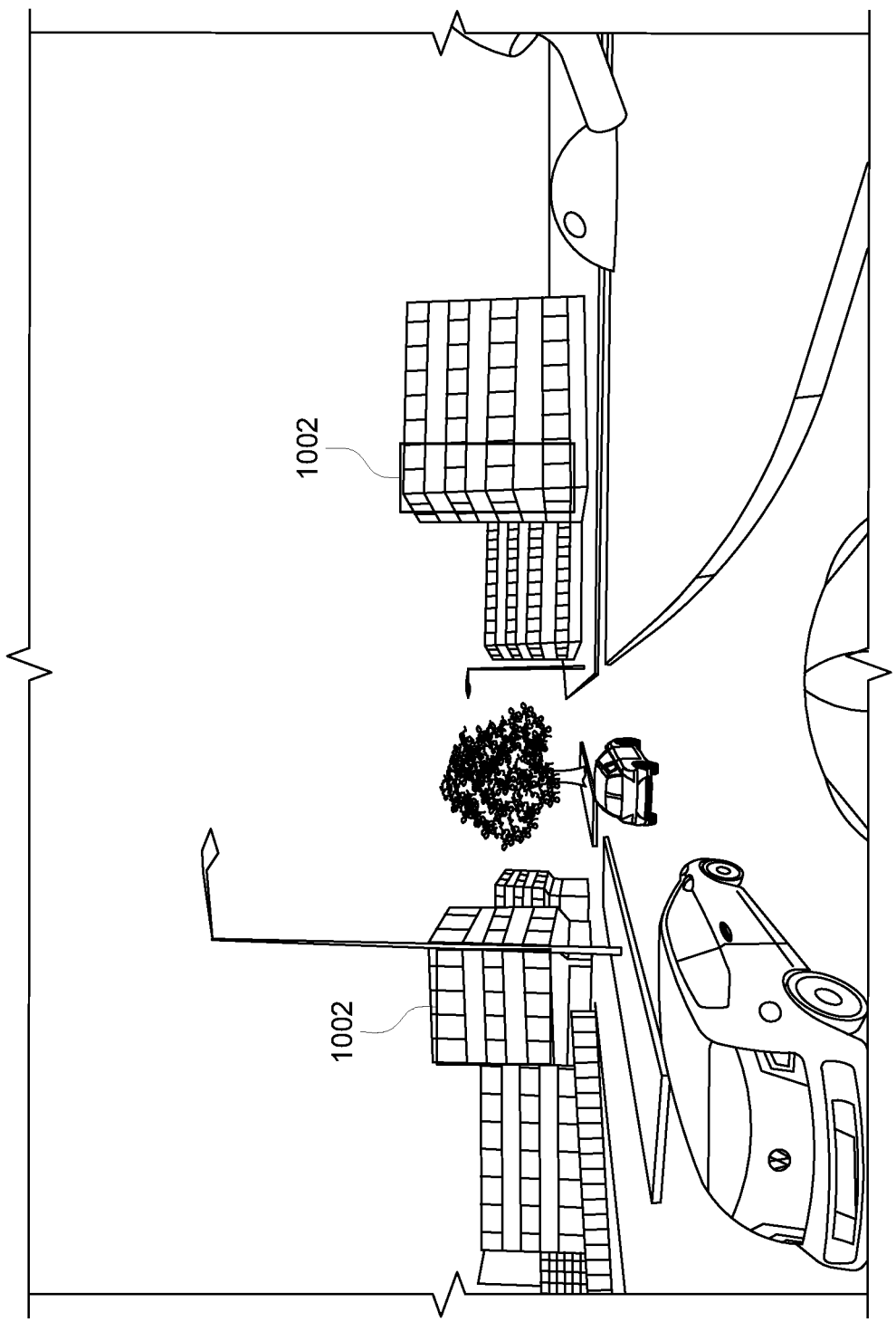
FIG. 13 depicts a street view of the geographical location, in accordance with one or more example embodiments.
Figure 14:
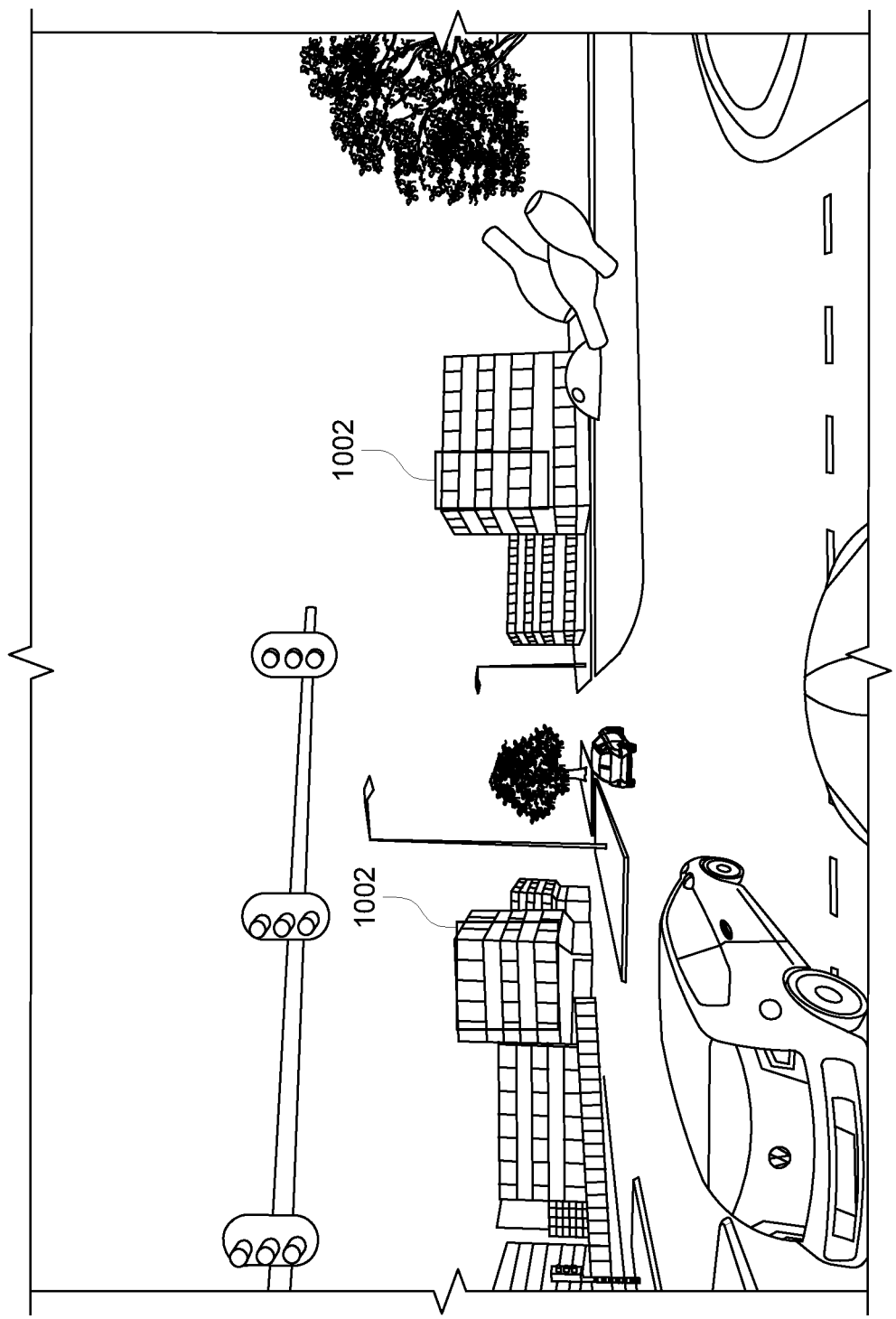
FIG. 14 depicts a street view of the geographical location, in accordance with one or more example embodiments.

In one or more embodiments, as illustrated in FIG. 9, shape figures 902 of each of the landmarks 308 in the template image 800 are determined. The shape figure 902 of any one of the landmarks 308 is generally a polygon enclosing the image pixels of the face 802 of the corresponding landmark 308. Further, as illustrated in FIG. 10, largest fitting rectangles 1002 fitting inside the shape figures 902 are determined. The largest fitting rectangle 1002 is a vertically fitting rectangle bounding maximum height of the shape figure 902 of the corresponding landmark 308. It may be understood that the purpose of using vertically fitting largest rectangle is to get a rectangular template which can cover height of the corresponding landmark 308 up to maximum, as the assumption is that higher parts of the landmark 308 are visible from the farther points. The information about the shape figures 902 and the largest bounding rectangles 1002 is added to the template image 800.

At step 408, the template image 800 is successively matched with a sequence of images of the landmarks 308 to determine a confidence score for each image in the sequence of images. This involves matching the template image 800 successively with the sequence of images of the landmarks 308 based on the largest fitting rectangle 1002, as depicted in FIGS. 11 to 16 of the accompanying drawings. The sequence of images may be captured by the imaging device 120 from multiple points of view on the source road 302 such that for each successive image, in the sequence of images, at least a portion of the landmarks 308 is captured in each successive image. Further, the portion of the landmarks 308 captured in each successive image is different. For example, the portion of the landmarks 308 captured in different successive images may be such that the imaging device 120 may be positioned farther from the landmarks 308 on the source road 302 in each different successive image. Herein, each image of the sequence of images has at least some portions of the landmarks 308 captured in the FOV of the imaging device 120. In the present embodiments, the confidence score is given based on percentage matching of the image pixels in the largest fitting rectangle 1002 of the image, in the sequence of images, with respect to the template image 800.

At step 410, a first image, from the sequence of images, is identified whose confidence score is below a predetermined threshold. In one exemplary configuration, the predefined threshold may have a value of about 85%. It may be contemplated that in such identified image, the landmarks 308 may not be properly visible to be utilized for generating the navigation data. In the accompanying drawings, the image depicted in FIG. 16 may be considered to be the one to have the confidence score below the predetermined threshold. As may be seen, the image of FIG. 16 has an obstacle in the form of a tree blocking a proper view of the landmarks 308.

It may be understood that the computing arrangement 110 may implement image segmentation and geo-referencing techniques to check if there are any obstacles (temporary or permanent) which are preventing clear viewing of the landmarks 308 in the image. Temporary obstacles are like car, truck, bike, pedestrian or any other vehicle; and permanent obstacles are like trees, vegetation, etc. Since the image pixels are segmented, the computing arrangement 110 may check if there are any image pixels in the selected template image 800 being classified as temporary or permanent obstacles. In some examples, the computing arrangement 110 may utilize some other images corresponding to a location at some further distance from the landmarks 308 and check if the obstacle is still blocking view from that location, if not the computing arrangement 110 may choose to select the template image 800 corresponding to that location. For example, in case the landmark 308b may be blocked partially by a tree in the first image captured by the imaging device 120, so instead of selecting the template image 800 from that first image as the source image 500, the computing arrangement 110 may check if the landmark 308b may be blocked by tree or any other obstacle in next image captured by the imaging device 120, and if not the computing arrangement 110 may choose the template image 800 from that second image as the source image 500. If none of the images in a specified range qualify for the stated selection criteria for the template image, then the landmark 308b may be marked as unsuitable for being used as a reference in the navigation data.

At step 412, a second image is selected from the sequence of images, such that the second image is immediately preceding the first image and the confidence score of the second image is above the predetermined threshold. In one example, a preceding image of the first image is selected such that a ratio of an area of the corresponding largest fitting rectangle to a total area thereof is above the predefined threshold. It may be contemplated that in such preceding image, at least one of the landmarks 308 may have an acceptable visibility level so as to be utilized for generating the navigation data. Since in the accompanying drawings, the image depicted in FIG. 16 may be considered to be the one to have the confidence score below the predetermined threshold; in that case, the preceding image that may be utilized would be the image as depicted in FIG. 15.

Figure 15:
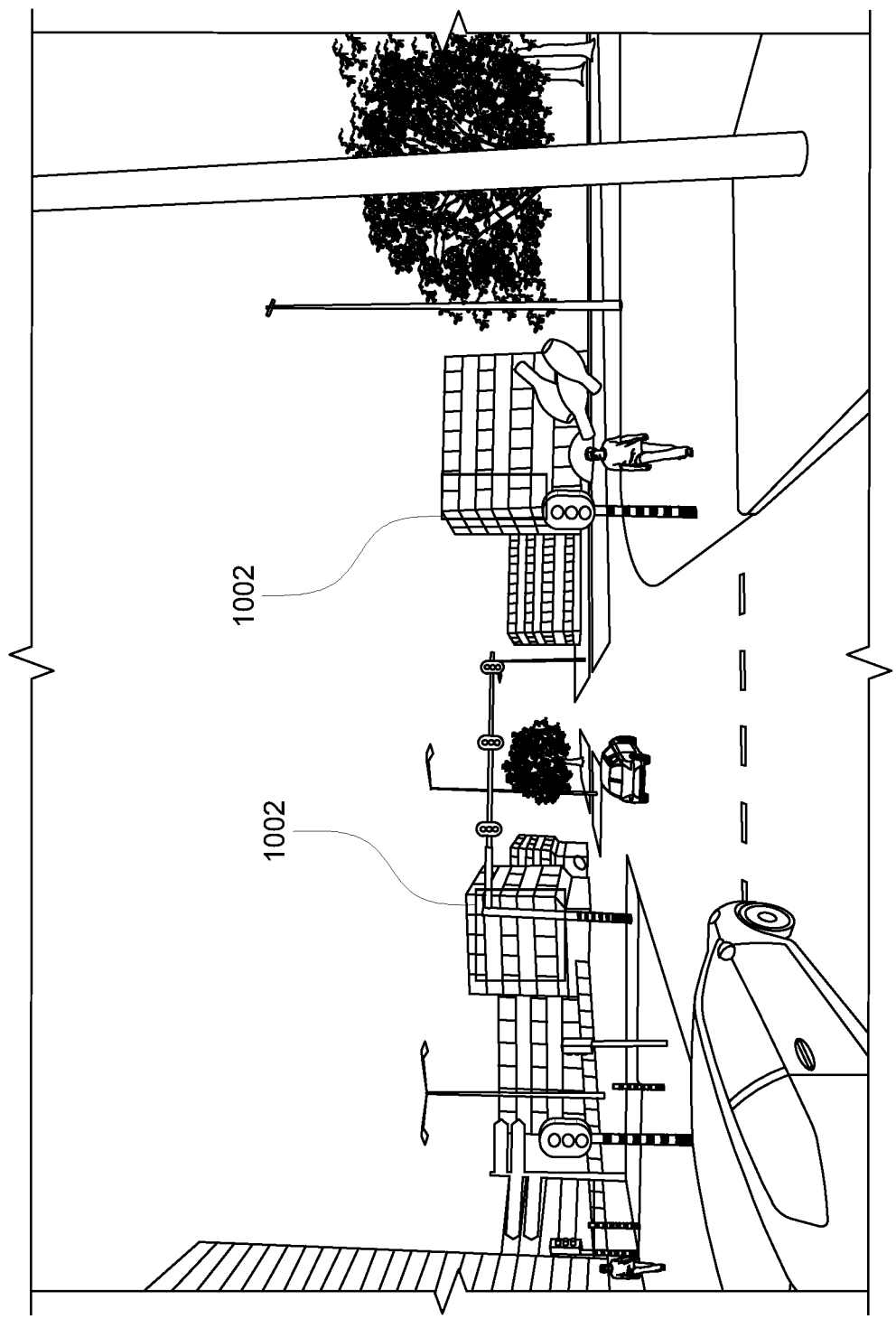
FIG. 15 depicts a street view of the geographical location, in accordance with one or more example embodiments.
Figure 16:
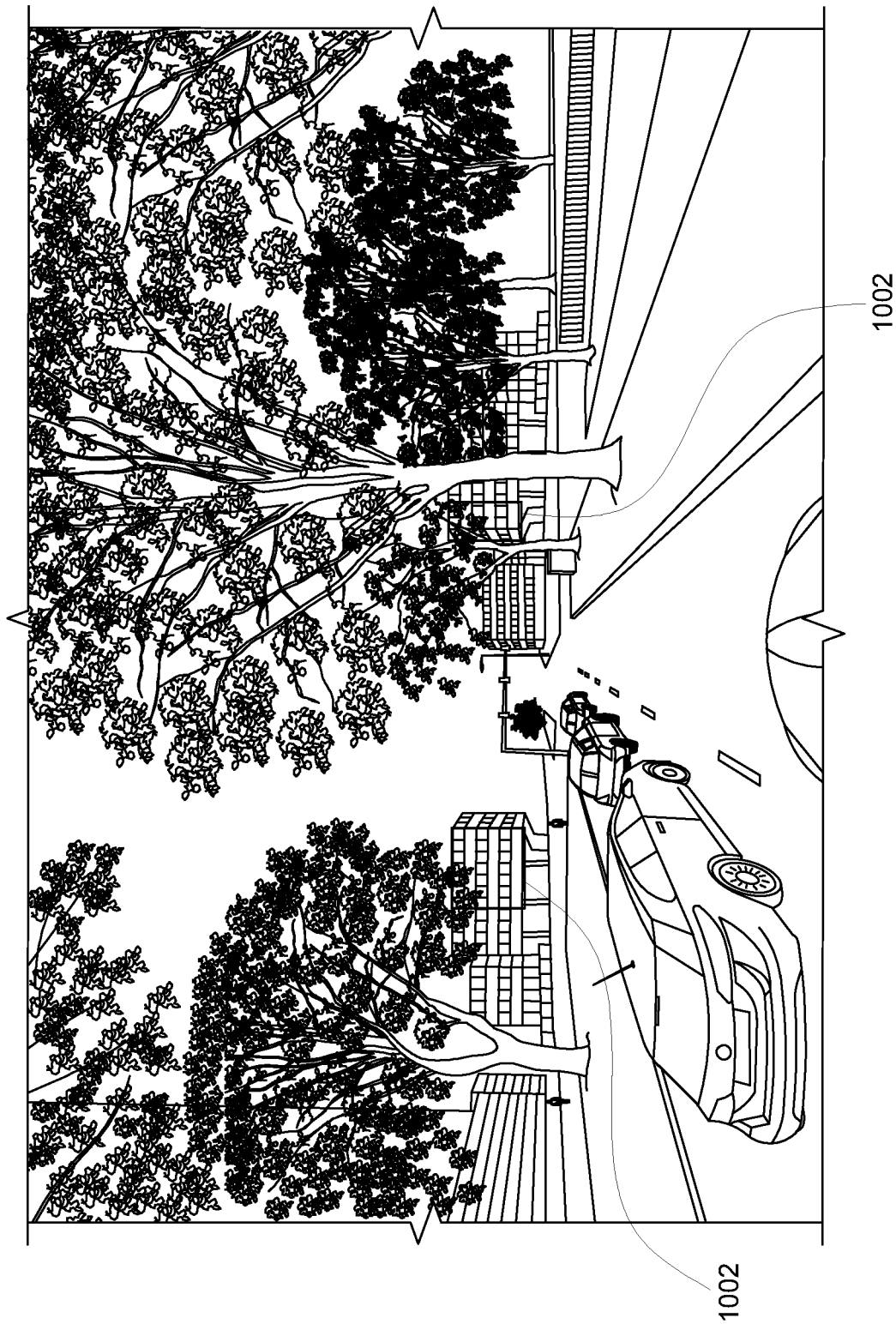
FIG. 16 depicts a street view of the geographical location, in accordance with one or more example embodiments.

At step 414, a visibility distance of the at least one landmark 308 is calculated based on the source image 500 and the second image, i.e. the image depicted in FIG. 15. In particular, the visibility distance of the at least one landmark 308 is calculated as distance between position of the imaging device 120 when the source image 500 was captured and position of the imaging device 120 when the second image, i.e. image as shown in FIG. 15, was captured. As mentioned earlier, since the position of the imaging device 120 corresponding to the source image 500 is substantially same as the position of the at least one landmark 308 itself (or the intersection between the source road 302 and the connecting road 304), thus the visibility distance provides substantively the maximum distance from which the at least one landmark 308 is clearly visible. It may be understood that, generally, the visibility distance is equal to a distance of the imaging device 120, corresponding to the image as depicted in FIG. 15, from the at least one landmark 308 on the source road 302. In one example, the position of the imaging device 120, for calculating the visibility distance, may be determined by employing the position sensor 130. In other examples, the distance between the imaging device 120, corresponding to the image as depicted in FIG. 15, and the at least one landmark 308 may be measured directly by employing the distance measuring device 122. In some embodiments, the distance between the imaging device 120 and the at least one landmark may be calculated based on using a distance calculation formula known in the art, such as the Haversine distance formula.

In one embodiment, the computing arrangement 110 may detect two or more potential landmarks, like the landmarks 308a and 308b, located along the source road 302 in the geographical location 300, such that each of the two or more potential landmarks 308a and 308b are suitable to be utilized for generating navigation data. In such case, the computing arrangement 110 may select the landmark 308, for determining the visibility distance, to be one of the one or more potential landmarks 308a and 308b which have generally better visibility throughout in the sequence of images among the two or more potential landmarks 308a and 308b. It may be understood that although the present embodiments have been described in terms of using two landmarks 308a and 308b, and finally selecting one of the two landmarks 308a and 308b which have better visibility through the sequence of images to be utilized for calculating visibility distance; in alternate examples, only one landmark 308 may be selected initially and utilized for calculating visibility distance without affecting the scope of the present disclosure.

At step 416, the navigation data is generated based on the calculated visibility distance. The navigation data may include one or more navigation routes from the source road 302 to at least one of the connecting roads 304 using the landmark 308 as a reference point and the calculated visibility distance as a reference distance. Further, the determined one or more navigation routes may be stored in a memory, such as the memory unit 140 and/or in the map database 140 for later retrieval. In some embodiments, the computing arrangement 110 may further perform a voice over process for providing turn-by-turn navigation instructions for the stored one or more navigation routes. The techniques for generating voice over content are well known in the art and thus have not been explained herein for the brevity of the present disclosure. Therefore, the navigation data may be employed to provide navigation instruction to the user for reaching a 'Destination X' via one of the connecting roads 304 while driving on the source road 302, such as "To reach 'Destination X' turn right from the 'landmark' at a distance of 'Y meters', and the like.

In one or more embodiments, one or more physical features of the at least one landmark 308 are recognized from at least one image from the sequence of images. Typically, the recognized physical feature may be a distinguishing feature of the landmark 308 in view of other landmarks. In one example, the recognized physical feature may be a discernible color of the at least one landmark 308 from at least one of the sequence of images utilizing prominent pixel intensities techniques, as may be implemented by the image processor 114 in the computing arrangement 110. Further, the one or more recognized physical features of the at least one landmark 308 are used as one or more references in the one or more navigation routes. For example, it may be determined that the at least one landmark 308 is primarily RED in color. In such case, the at least one landmark 308 may be labeled as RED building in the navigation data. Further, the navigation data may be employed to provide navigation instruction to the user for reaching a 'Destination X' via one of the connecting roads 304 while driving one the source road 302, such as "To reach 'Destination X' turn right from the 'RED building' at a distance of 'Y meters', and the like.

The present disclosure also provides a computer program product comprising at least one non-transitory computer-readable storage medium having computer-executable program code instructions stored therein, the computer-executable program code instructions comprising program code instructions to identify the at least one landmark 308 located along the source road 302 in the geographical location 300 from the source image 500 captured by the imaging device 120; segment the source image 500 using a deep learning model to identify the segmentation mask 600; generate the template image 800 based on the segmentation mask 600 and the street image 700 of the at least one landmark 308, wherein the street image 700 comprises a 2D footprint of the at least one landmark 308 falling within the field-of-view of the imaging device 120; match the template image 800 successively with a sequence of images of the at least one landmark 308 to determine a confidence score for each image in the sequence of images; identify a first image from the sequence of images whose confidence score is below a predetermined threshold; select a second image from the sequence of images, that is immediately preceding the first image in the sequence of images and whose confidence score is above the predetermined threshold; calculate a visibility distance of the at least one landmark 308 based on the source image 700 and the second image; and generate the navigation data based on the calculated visibility distance.

In one or more embodiments, the computer-executable program code instructions further comprise program code instructions to determine the shape figure 902 of the at least one landmark 308 in the template image 800; determine the largest fitting rectangle 1002 fitting inside the shape figure 902; and match the template image 800 successively with the sequence of images of the at least one landmark 308 based on the largest fitting rectangle.

It may be contemplated that the system 100 and the method 400 of the present disclosure may be implemented in real-time for generation of navigation data, while a user may utilize the generated navigation data concurrently for, say, determining navigation route to a destination. In some examples, the user may provide some commands, via the user interface 170, to change behavior of the system 100 and/or the method 400 for generation of navigation data. This may include changing orientation of the imaging device 120, changing focal length to vary FOV of the imaging device 120, changing values of one or more thresholds, etc. In some embodiments, one or more geo-tagged images already available from a library or database of images of the geographical location 300 may be utilized for determining the navigation data without even the need of the vehicle 200 along with the imaging device 120 to travel along the source road 302 for capturing the images. In other embodiments, the images are collected via crowdsourcing from one or more vehicles with a camera installed thereon and travelling along the source road 302 in the geographical location 300.

The system 100 and the method 400 of the present disclosure provide end to end automation for generating navigation data based on natural landmark based guidance without the need of any human intervention. The method 400 utilizes the street images and the geometry information of potential landmarks stored in the map database 160 to automatically identify landmarks which can be utilized as a reference in the navigation route from the source road 302 to at least one of the connecting roads 304 and further derives the visibility distance of the landmark using computer vision and deep learning algorithms to successfully automate generation of the navigation data. Therefore, the system 100 and the method 400 of the present disclosure provide more efficient, accurate and cost-effective means for generation of navigation data for any geographical location as compared to known systems and methods.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for generating navigation data of a geographical location, the method comprising:

identifying at least one landmark located along a source road in the geographical location from a source image captured by an imaging device;

segmenting the source image using a deep learning model to identify a segmentation mask;

generating a template image based on the segmentation mask and a street image of the at least one landmark, wherein the street image comprises a 2D footprint of the at least one landmark falling within a field-of-view of the imaging device;

matching the template image successively with a sequence of images of the at least one landmark to determine a confidence score for each image in the sequence of images;

identifying a first image from the sequence of images whose confidence score is below a predetermined threshold;

selecting a second image from the sequence of images, that is immediately preceding the first image in the sequence of images, wherein the confidence score of the second image is above the predetermined threshold;

calculating a visibility distance of the at least one landmark based on the source image and the second image;

generating the navigation data based on the calculated visibility distance;
determining a shape figure of the at least one landmark in the template image;
determining a largest fitting rectangle fitting inside the shape figure;
matching the template image successively with the sequence of images of the at least one landmark based on the largest fitting rectangle.

2. The method of claim 1, wherein the largest fitting rectangle is a vertically fitting rectangle bounding maximum height of the shape figure.

3. The method of claim 2, wherein the sequence of images is captured by the imaging device from multiple points of view on the source road, wherein each of the sequence of images has at least a portion of the at least one landmark, and wherein a size of the at least one landmark corresponding to the at least portion is different in each of the sequence of images, and wherein the largest fitting rectangle is resized on the basis of the size of the at least one landmark corresponding to the at least portion in each of the sequence of images.

4. The method of claim 1, wherein the source image is segmented for detection and localization of the at least one landmark.

5. The method of claim 1 further comprising:
detecting one or more potential landmarks located along the source road in the geographical location; and
selecting the at least one landmark, for determining the visibility distance, having better visibility in the sequence of images among the one or more potential landmarks.

6. The method of claim 1 further comprising:
determining one or more navigation routes from the source road to each of one or more connecting roads using the at least one landmark as a reference point and the visibility distance as a reference distance based on the generated navigation data;
storing the determined one or more navigation routes; and
performing a voice over process for providing turn-by-turn navigation instructions for the stored one or more navigation routes.

7. The method of claim 6 further comprising:
recognizing one or more physical features of the at least one landmark from at least one of the sequence of images; and
using the one or more recognized physical features of the at least one landmark as one or more references in the one or more navigation routes.

8. The method of claim 7, wherein a discernible color of the at least one landmark is recognized from at least one of the sequence of images utilizing prominent pixel intensities techniques.

9. A system for generating navigation data of a geographical location, the system comprising:
at least one database configured to store a sequence of images of at least one landmark located along a source road in the geographical location; and
a computing arrangement configured to:
identify the at least one landmark from a source image captured by an imaging device;
segment the source image using a deep learning model to identify a segmentation mask;
generate a template image based on the segmentation mask and a street image of the at least one landmark, wherein the street image comprises a 2D footprint of the at least one landmark falling within a field-of-view of the imaging device;
match the template image successively with the sequence of images to determine a confidence score for each image in the sequence of images;
identify a first image from the sequence of images whose confidence score is below a predetermined threshold;
select a second image from the sequence of images, that is immediately preceding the first image in the sequence of images, wherein the confidence score of the second image is above the predetermined threshold;
calculate a visibility distance of the at least one landmark based on the source image and the second image;
generate the navigation data based on the calculated visibility distance;
determine a shape figure of the at least one landmark in the template image;
determine a largest fitting rectangle fitting inside the shape figure; and
match the template image successively with the sequence of images based on the largest fitting rectangle.

10. The system of claim 9, wherein the largest fitting rectangle is a vertically fitting rectangle bounding maximum height of the shape figure.

11. The system of claim 10, wherein the imaging device is configured to capture the sequence of images from multiple points of view on the source road, wherein each of the sequence of images has at least a portion of the at least one landmark, and wherein a size of the at least one landmark corresponding to the at least portion is different in each of the sequence of images, and wherein the largest fitting rectangle is resized on the basis of the size of the at least one landmark corresponding to the at least portion in each of the sequence of images.

12. The system of claim 9, wherein the source image is segmented for detection and localization of the at least one landmark.

13. The system of claim 9, wherein the computing arrangement is further configured to:
detect one or more potential landmarks located along the source road in the geographical location; and
select the at least one landmark, to determine the visibility distance, having better visibility in the sequence of images among the one or more potential landmarks.

14. The system of claim 9, wherein the computing arrangement is further configured to:
determine one or more navigation routes from the source road to each of one or more connecting roads using the at least one landmark as a reference point and the visibility distance as a reference distance based on the generated navigation data;
store the determined one or more navigation routes; and
perform a voice over process to provide turn-by-turn navigation instructions for the stored one or more navigation routes.

15. The system of claim 14, wherein the computing arrangement is further configured to:
recognize one or more physical features of the at least one landmark from at least one of the sequence of images; and
use the one or more recognized physical features of the at least one landmark as one or more references in the one or more navigation routes.

16. The system of claim 15, wherein a discernible color of the at least one landmark is recognized from at least one of the sequence of images utilizing prominent pixel intensities techniques.

17. A computer program product comprising at least one non-transitory computer-readable storage medium having computer-executable program code instructions stored therein, the computer-executable program code instructions comprising program code instructions to:

identify at least one landmark located along a source road in a geographical location from a source image captured by an imaging device;

segment the source image using a deep learning model to identify a segmentation mask;

generate a template image based on the segmentation mask and a street image of the at least one landmark, wherein the street image comprises a 2D footprint of the at least one landmark falling within a field-of-view of the imaging device;

match the template image successively with a sequence of images of the at least one landmark to determine a confidence score for each image in the sequence of images;

identify a first image from the sequence of images whose confidence score is below a predetermined threshold;

select a second image from the sequence of images, that is immediately preceding the first image in the sequence of images, wherein the confidence score of the second image is above the predetermined threshold;

calculate a visibility distance of the at least one landmark based on the source image and the second image;

generate the navigation data based on the calculated visibility distance;

determine a shape figure of the at least one landmark in the template image;

determine a largest fitting rectangle fitting inside the shape figure; and match the template image successively with the sequence of images of the at least one landmark based on the largest fitting rectangle.

\* \* \* \* \*